(12) United States Patent
Brion et al.

(10) Patent No.: US 11,634,080 B2
(45) Date of Patent: Apr. 25, 2023

(54) TRANSPORT VEHICLE WALKWAY ASSEMBLY

(71) Applicant: Faiveley Transport Tours, Saint-Pierre-des-Corps (FR)

(72) Inventors: Florian Brion, Notre Dame d'oe (FR); Yann Brunet, Tours (FR); Fabien Vautier, Veretz (FR); Thierry Montanie, Paris (FR); Aurélien Gohard, St Amano Longpre (FR); Yannick Saluden, Amboise (FR); Matthieu Lefort, Beaumont en Veron (FR); Valérie Klein, Saint Avertin (FR)

(73) Assignee: FAIVELEY TRANSPORT TOURS, Saint-Pierre-des-Corps (FR)

( * ) Notice: Subject to any disclaimer, the term of this patent is extended or adjusted under 35 U.S.C. 154(b) by 328 days.

(21) Appl. No.: 17/031,408

(22) Filed: Sep. 24, 2020

(65) Prior Publication Data
US 2021/0101533 A1 Apr. 8, 2021

(30) Foreign Application Priority Data
Oct. 2, 2019 (FR) .......................................... 1910905

(51) Int. Cl.
*B60R 3/00* (2006.01)
*B61D 17/10* (2006.01)

(52) U.S. Cl.
CPC ................ *B60R 3/00* (2013.01); *B61D 17/10* (2013.01)

(58) Field of Classification Search
CPC .................................. B60R 3/00; B61D 17/10
See application file for complete search history.

(56) References Cited

U.S. PATENT DOCUMENTS

| 5,636,399 A | 6/1997 | Tremblay |
| 7,802,337 B2 * | 9/2010 | van Roosmalen .... E04F 11/002 14/71.1 |
| 8,438,683 B1 * | 5/2013 | Morris ................... A61G 3/067 14/71.1 |

(Continued)

FOREIGN PATENT DOCUMENTS

| DE | 20104221 U1 | 7/2001 |
| DE | 102007022387 A1 | 11/2008 |

(Continued)

OTHER PUBLICATIONS

European Search Report dated Feb. 16, 2021 for EP Patent Application No. 20194774 (9 pages).

*Primary Examiner* — Bryan A Evans
(74) *Attorney, Agent, or Firm* — The Small Patent Law Group LLC; Christopher R. Carroll

(57) ABSTRACT

This assembly firstly comprises a framework fastened on the body of a vehicle, a swiveling floor intended for the forward motion of travelers, in particular, persons with reduced mobility, and an intermediate device, located below the surface for forward motion. The intermediate device and the swiveling floor are able to swivel in relation to the framework in a mutually independent manner. This assembly moreover comprises a sliding system that is movable in translation in relation to the intermediate device between a stowed position and a deployed position, in which this sliding system forms, together with the surface for forward motion, a ramp extending through a lateral opening of the framework.

20 Claims, 13 Drawing Sheets

(56) References Cited

U.S. PATENT DOCUMENTS

2001/0038787 A1    11/2001  Beck et al.
2001/0048870 A1*   12/2001  Lewis .................... A61G 3/061
                                                      414/537
2017/0282774 A1*   10/2017  Schepmann ............ B60P 1/433

FOREIGN PATENT DOCUMENTS

| DE | 102014207349 A1 | 10/2015 |
|----|-----------------|---------|
| EP | 0217265 A1      | 4/1987  |
| EP | 0230888 A2      | 8/1987  |
| EP | 1034765 A2      | 9/2000  |
| EP | 2103498 B1      | 5/2014  |
| EP | 2781424 A1      | 9/2014  |
| EP | 3081450 A1      | 10/2016 |
| WO | 1999052738 A1   | 10/1999 |

* cited by examiner

TRANSPORT VEHICLE WALKWAY ASSEMBLY

CROSS-REFERENCE TO RELATED APPLICATIONS

This application claims priority to French patent application 1910905, which was filed on 2-Oct.-2019, and the entire disclosure of which is incorporated by reference.

BACKGROUND

Technical Field

The inventive subject matter relates to a walkway assembly, intended to equip a transport vehicle. It also relates to a transport vehicle which is equipped with at least one such walkway assembly. Lastly, it relates to a method for implementation of this transport vehicle, in particular, one that has a deployment or stowing of an access ramp belonging to this walkway assembly. The inventive subject matter finds application in transport vehicles, in particular in trains, trams, subways, trolley buses, or even buses. It more specifically, but not exclusively, concerns passenger trains.

State of the Art

Particular transport vehicles are traditionally equipped with walkway assemblies, intended to facilitate access of travelers. Indeed, train/bus platforms intended for vehicle stops and then the boarding and descending of travelers, as well as the floors of vehicles, are often located at different heights. These walkway assemblies comprise, in particular, an access device for users, which is movable between a stowed and a deployed position.

There are firstly walkway assemblies, in which this device consists of a plate that is movable in rotation in relation to the body of the vehicle, most frequently about the longitudinal axis of said vehicle. Thus, in its stowed position, this plate is upright in a substantially vertical manner, in the proximity of the body. Such walkway assemblies are not the ones intended by this invention.

Indeed, the inventive subject matter more specifically relates to walkway assemblies in which the access device is, as a whole, movable in translation. Thus, in its stowed position, it is retracted in a substantially horizontal position, in the proximity of the fixed floor belonging to the body of the vehicle. Moreover, in its deployed position, its free end can generally be supported by the train/bus platform or remain cantilevered.

Transport vehicles are known that are equipped with a sliding plate that is capable of being deployed in translation in relation to the body, typically according to a horizontal movement. This plate does indeed overcome the horizontal gap that exists between the train/bus platform and the door. Given that said plate is deployed according to a movement the slope of which is not variable, however, this solution does not allow for adaptation for use with train/bus platforms of varying heights.

To overcome this shortcoming, it has been proposed to equip transport vehicles with an inclinable ramp. In practice, this ramp moves in relation to the body according to a translational motion, the final incline of which depends on the difference in height between the train/bus platform and the floor of the vehicle. This solution, at least in theory, allows for the resolution of the problem linked to the use of the aforementioned sliding plates.

It does however imply other shortcomings, in particular when the difference in heights between the body and the train/bus platform is great. Indeed, in this configuration, the inclined ramp has a pronounced slope. This is not satisfactory, in particular, as regards an easy and safe access for persons with reduced mobility (PRM). The designation PRM encompasses not only persons having permanent handicaps, i.e. those in wheelchairs or the blind, but also travelers having a temporary reduction in the ability to move around in public, i.e. travelers transporting voluminous luggage or even pregnant women.

To offer a lesser slope to this inclinable ramp, it is of course possible to provide it with a larger length. This alternative is also not satisfactory, in particular inasmuch as such a ramp has a horizontal footprint, on the train/bus platform, that generates considerable interference to travelers waiting on this train/bus platform. As a consequence, its activation, in particular when done in an automated manner, is in such a case particularly inconvenient in practice.

Other solutions are also known, in which the body of the vehicle is equipped with a platform located in the proximity of the doors and that is movable in a vertical plane in relation to the fixed floor. Once the platform is placed at the same height as the train/bus platform, it is then possible to deploy a traditional access device (or walkway) for the passengers. EP 2 103 498 is cited in particular among prior patents describing such a movable platform.

This alternative solution also presents some specific shortcomings, in particular, in terms of safety. Indeed, in the event where the platform has a deployable walkway that is integrated into the body, the horizontal shortcoming is not overcome prior to the opening of the doors which is required to extend the walkway if it is recessed in the sash. Even when the walkway is located under the door sash(es), this creates a gaping opening between the lowered platform and the sash(es) of the opposing door. In these two cases, such shortcomings are to be avoided because they imply the risk of falling objects or even passengers on the track.

Lastly, in particular, from European patent EP 0 230 888 and from German utility model DE 2010 4221, we know of an additional solution which makes use of a platform that is mounted in a swiveling movable manner in relation to the fixed floor of the body. A sliding plate on this platform, in DE 2010 4221, furthermore allows for the horizontal shortcoming to be overcome.

This last solution is not fully satisfactory. Indeed, a shortcoming of this device lies in the mechanical connection between the door sash(es) and the inclined platform. Indeed, this platform cannot begin to be inclined before the opening of the door, as this creates a space between the platform and the door panel, which is prejudicial to safety. Moreover, if the device is inclined following the deployment of the sliding plate, it is possible to injure the feet of passengers who are present on the train/bus platforms.

Taking the foregoing into consideration, one goal of the inventive subject matter is to overcome, at least partially, the shortcomings of the prior art referred to above.

Another goal of the inventive subject matter is to propose a walkway assembly which ensures an easy and safe access to travelers using train/bus platforms intended for vehicle stops, having rather different heights.

Another goal of the inventive subject matter is in particular to propose such a walkway assembly, the implementation of which does not create any spatial shortcoming, that is likely to entail danger, in particular fall risks.

Another goal of the inventive subject matter is to propose such a walkway assembly, possessing an extendible ramp that is particularly suited for access by persons with reduced mobility, in terms of comfort and safety.

BRIEF SUMMARY

According to the inventive subject matter, at least one of the above goals is achieved by means of a first main purpose of the inventive subject matter, which is a walkway assembly (I, I') for a transport vehicle (100), in particular trains, trams, subways, trolleybuses or even buses, with this assembly comprising:

- a framework (1) with fastening means (26, 28) on the body (102) of the transport vehicle, this framework delimiting a lateral opening (20)
- a swiveling floor (9), located during operation in the proximity of the door (106) of the transport vehicle, this swiveling floor being intended for the forward motion of the travelers, in particular, of persons with reduced mobility, this swiveling floor comprising a surface for forward motion (90) and being mounted in a swiveling manner in relation to the framework about a first swivel axis (A1), provided opposite to the said lateral opening (20),
- an intermediate device (3), located below the surface for forward motion (90), this intermediate device being mounted in a swiveling manner in relation to the framework about a second swivel axis (A1), which is, in particular, substantially coincident with the first swivel axis, the intermediate device and the swiveling floor (9) able to swivel relative to the framework in a mutually independent manner,
- a sliding system (7) that is movable in translation in relation to the intermediate device (3) between a stowed position and an deployed position, in which this sliding system forms, together with the surface for forward motion (90), a ramp (99) that extends through the said lateral opening (20).

According to other features of the above first main purpose of the inventive subject matter, taken individually or according to any technically compatible combination:

- this assembly comprises first propulsion (4) and first transmission means (5, 56, 57, 58 24) allowing the swiveling of the intermediate device, as well as second propulsion means (4) and second transmission means (5, 56, 57, 58, 97) allowing the swiveling of the swiveling floor;
- the first propulsion means and the second propulsion means are formed by a single propulsion assembly (4) able to respectively cooperate with the first transmission means and the second transmission means;
- this assembly furthermore comprises selection means which present a first operational configuration in which they ensure the swiveling of the intermediate device (3), as well as a second operational configuration in which they ensure the swiveling of the swiveling floor (9);
- these selection means comprise a lever (57) ending in a roller (58), this lever being able to be driven by a transmission shaft (5), the roller being able to selectively cooperate with either a first transmission body (22, 24), or with a second transmission body (97);
- the first transmission body comprises an accommodation (22, 24) that is consolidated with the framework, the roller (58) being able to roll along the walls of this accommodation in such a manner as to ensure the swiveling of the intermediate device, through the intermediary of the effect brought about by the lever, whereas the second transmission body comprises a support element (97) that is consolidated with the swiveling floor (9), with this support element being able to cooperate with the roller (58);
- this assembly furthermore comprises means (52, 75) for driving of the sliding system (7) in relation to the intermediate device (3), these driving means being, in particular, able to cooperate with the first propulsion means or the second propulsion means, these driving means of the sliding system (7) comprising, in particular, at least one chain (52) or a belt, able to be driven by the first propulsion means or the second propulsion means, as well as at least one respective mechanical connecter (75), able to consolidate the chain with the sliding system;
- this assembly furthermore comprises means (17) for the locking of the swiveling floor (9) in relation to the framework (1), which are movable between an active position in which they lock the swiveling floor in relation to the framework, and an inactive position in which they free the swiveling floor in relation to the framework, in such a way as to allow the swiveling of this swiveling floor under the effect of the second propulsion means;
- this assembly furthermore comprises means (35) for consolidation of the swiveling floor (9) in relation to the intermediate device (3), which are able to mutually consolidate this swiveling floor and this intermediate device, exclusively during upwards motions;
- the sliding system (7) comprises a succession of blades (8) that are movable perpendicularly to their main dimension, these blades being mutually parallel and furthermore, during operation, being parallel to the axis of travel of the vehicle;
- the intermediate device (3) comprises a first track (36) for movement of the blades, perpendicularly to their main dimension, whereas the sliding system (7) comprises another track (78) for movement of the blades, the assembly comprising means of shifting the blades between these tracks, the means of shifting in particular comprising at least one carriage (85) linking two adjacent blades, each carriage being able to bear against the side wall of each slide, two carriages (85) associated with each pair of adjacent blades being advantageously provided, each at a respective end of the blades, these two carriages being movable away from each other, in particular under the effect of elastic means (88).

A second main purpose of the inventive subject matter is a transport vehicle (100), in particular a train, tram, subway, bus or even trolleybus, comprising at least a walkway assembly (I, I') as defined above.

According to other features of this second main purpose of the inventive subject matter, taken individually or according to any technically compatible combination:

- the body (102) of this transport vehicle comprises a so-called fixed floor (104), the surface for forward motion (90) of the swiveling floor (9) being located in the same plane as the fixed floor, in a so-called rest position of the swiveling floor, whereas the fixed floor and the surface for forward motion define a continuity of surfaces, i.e. without any substantial offset, in an inclined position of this swiveling floor in relation to the fixed floor;
- each walkway assembly extends only over a portion of the width of the body, in particular, over substantially the half of this width;

this vehicle comprises two walkway assemblies (I, I') laid out on the one and the other side of the transverse direction of the body, the swiveling axes (A1, A1') of these assemblies extending in immediate proximity of one another.

A third main purpose of the inventive subject matter is an implementation of a transport vehicle (100) as above, in which the fixed floor (104) of the body is located above a traveler disembarkation train/bus platform (200), this method comprising the following steps, in the sequence of opening of the door of this vehicle:

downwards swiveling of the intermediate device (3), in relation to the framework (arrow F3),
    translational displacement of the sliding system (7) in the opposite direction of the intermediate device (arrow F7),
    downwards swiveling of the swiveling floor (arrow F9),
    opening of the door (106) (arrow F106).

This method can moreover advantageously comprise an unlocking step (arrow F17) of the locking element (17), between the translational displacement of the sliding system and the downwards swiveling of the swiveling floor.

This method can moreover advantageously comprise the following steps, in the sequence of closing of the door:

upwards swiveling of the swiveling floor (9),
    closing of the door,
    retraction of the swiveling floor in relation to the intermediate device.

This method can moreover comprise a step of locking of the locking element between the swiveling of the swiveling floor and the closing of the door.

A fourth main purpose of the inventive subject matter is a method for implementation of a transport vehicle such as above, in which the fixed floor of the body is located below a traveler disembarkation train/bus platform, this method comprising the following steps, in the opening sequence of the vehicle door:

translational displacement of the sliding system (7) in the opposite direction of the intermediate device,
    opening of the door,
    simultaneous upwards swiveling of the intermediate device and of the swiveling floor.

This method can moreover advantageously comprise the following steps, in the closing sequence of the vehicle door:

simultaneous downwards swiveling of the intermediate device and of the swiveling floor,
    closing of the door,
    translational displacement of the sliding system (7) towards the intermediate device.

A fifth main purpose of the inventive subject matter is a walkway assembly for transport vehicles, in particular, trains, trams, subways, buses or even trolleybuses, this assembly comprising:

a framework comprising fastening means on the body of the transport vehicle,
    a sliding device that is movable in relation to the framework between a stowed position and a deployed position, in which this sliding device forms at least one part of an access ramp, this walkway assembly being characterized in that the sliding device is formed by a succession of blades that are movable perpendicularly to their main dimension, these blades being mutually parallel and moreover parallel during operation to the axis of travel of the vehicle.

According to other features of this fifth main purpose of the inventive subject matter, taken individually or according to any technically compatible combination:

a first track (36) for movement of the blades is provided, as well as another track (78) for movement of the blades, the assembly comprising means of shifting the blades between these tracks;
    the means of shifting, in particular, comprise at least one carriage (85) linking two adjacent blades, each carriage being able to bear against the side wall of each slide;
    two carriages (85) associated with each pair of adjacent blades are provided, each at a respective end of the blades, these two carriages being movable away from each other, in particular under the effect of elastic means (88);
    the said walkway assembly moreover comprises a swiveling floor located during operation in the proximity of the door of the transport vehicle, this swiveling floor being intended for the forward motion of the travelers, in particular of persons with reduced mobility, this swiveling floor comprising a surface for forward motion.

A sixth purpose of the inventive subject matter is a transport vehicle, in particular trains, trams, subways, buses or even trolleybuses, comprising at least one walkway assembly as defined immediately above, the said walkway assembly moreover comprising a swiveling floor located during operation in the proximity of the door of the transport vehicle, this swiveling floor being intended for the forward motion of travelers, in particular persons with reduced mobility, this swiveling floor comprising a surface for forward motion, the body of this transport vehicle comprising a so-called fixed floor, the surface for forward motion of the swiveling floor being located in the same plane as the fixed floor, in a so-called rest position of the swiveling floor, whereas the fixed floor and the surface for forward motion define a continuity of surfaces, i.e. without any substantial offset, in an inclined position of this swiveling floor in relation to the fixed floor.

BRIEF DESCRIPTION OF THE FIGURES

The inventive subject matter is going to be described here below, with reference to the appended drawings, given exclusively by way of non-limiting examples, in which.

DETAILED DESCRIPTION

The following numerical references are used in this description.

Figure 1:
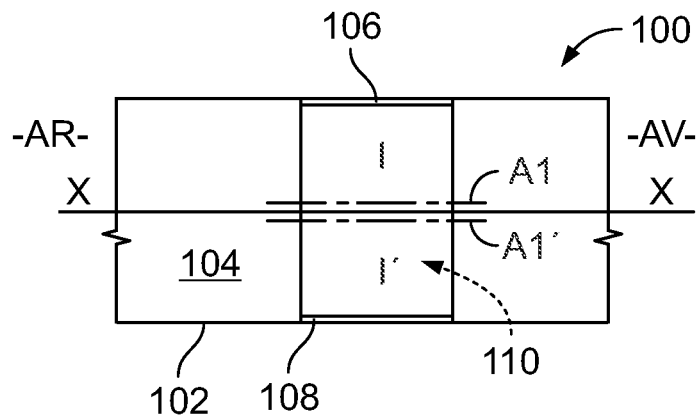
FIG. 1 is a view from above, illustrating in a schematic manner a portion of a transport vehicle equipped with two walkway assemblies that comply with the inventive subject matter.
Figure 2:
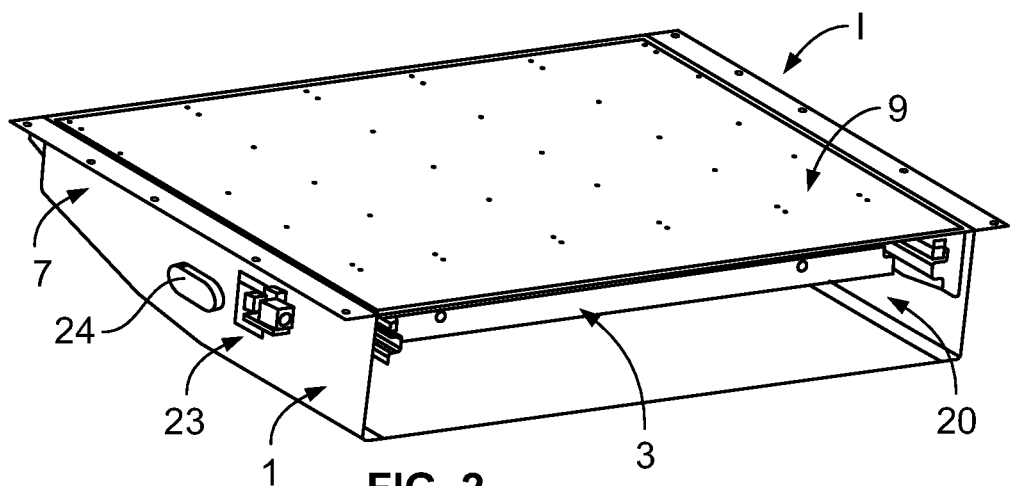
FIG. 2 is a perspective view, illustrating in the largest scale one of the two walkway assemblies of FIG. 1.

I and I' walkway assemblies
XX: axis of travel
100: transport vehicle
102: body of the vehicle
104: fixed floor of the body
106 and 108: doors
110: reinforcement
1: framework
10: bottom of 1
11: physical swiveling axis
12: inside wing
14: eyelets
16 and 18: flanks
20: lateral opening
22 and 24: accommodations
26 and 28: edges
17: locking hook
19: locking end
21: indentation in the flank 16
23: actuator of 17
3: swiveling intermediate device
30: bottom
31: wing
32: eyelets
33 and 34: flanks
35: tab
36: lower slide
37: cam surface
38: upwards transitions
39: grooves
4: propulsion
40: output shaft
41 and 42: gears
43 and 44: chains
45 and 46: additional gears
47 and 48: flanges
49: driving crown gear
5: main shaft
A5: main axis of the shaft 5
50: bearings
51: transmission crown gears
52: chain
53 and 54: idler gears
55: fluted portions
56: barrel
57: levers 58: roller
60: rod
61: disk spacer
62 and 63: connecting rods
7: sliding system
7': free edge of 7
70: frame
71 and 72: side bars
73 and 74: cross pieces
75: mechanical connectors
77: cross piece rollers 73 74
78: upper slide
8A: initial blade
8B through 8F: main blades
8G: intermediate blade
8H: final blade
80: elevation
81: junction profile
82: flank of each blade
83: stems
84: open-ended accommodations of blades
85: carriages
86: support rollers
87: guidance rollers
88: compression spring
9: swiveling floor
90: surface for forward motion
91: reinforcement structures
92: tapered end
90': free edge of 90
93: step
94: eyelets
A1: characteristic swiveling axis
95 and 96: flanks
97: bearing pads
98: hooking pin
99: access ramp
200: train/bus platform FIG. 1 illustrates in a schematic manner, a section of transport vehicle 100 which is equipped with two walkway assemblies according to the inventive subject matter, respectively designated by the references I and I'. This vehicle is, for example, a train, a tram, a subway, a bus or even a trolleybus. The longitudinal axis XX, or axis of travel of this vehicle 100, is noted. AV for front and AR for rear are also noted for the vehicle, in reference to the direction of travel. In that which follows, the geometric orientations of the various mechanical elements that make up the walkway assemblies according to the invention, refer to this axis XX.

In FIG. 1 a section of the body 102 of this vehicle, the fixed floor 104 of this body, as well as two doors 106 and 108 provided facing a corresponding walkway assembly I and I', have only been represented in a simplified manner. The fixed floor 104 has a transverse reinforcement 110 dug out, in which the assemblies I and I' are implanted. In this embodiment, these assemblies I and I' are laid out in an overall symmetrical manner, in relation to the axis of travel XX. Furthermore, their characteristic swiveling axes A1 and A1', which will be described in more detail hereafter, are placed in immediate proximity on one and the other side of the axis XX.

As a variant that is not shown, this vehicle can be equipped with a single walkway assembly according to the inventive subject matter. In this case, it is advantageous that the assembly does not extend over the entirety of the transverse direction, or width, of the vehicle. Typically, this single walkway assembly substantially extends over the half of this width.

The structure of the walkway assembly I will now be described, in reference to FIG. 2 to FIG. 17, with it being stretched in 10 that the other assembly I' is analogous. This walkway assembly I substantially comprises a framework 1 intended to be fastened on the body 102, an intermediate device 3, as well as a sliding system 7 able to slide in relation to the intermediate device 3, as well as a swiveling floor 9 intended for the passage of travelers. As will be described in great detail, both the intermediate device and the movable floor are able to swivel in relation to the framework 1, independently one from the other, about the aforementioned characteristic axis A1.

Figure 3:
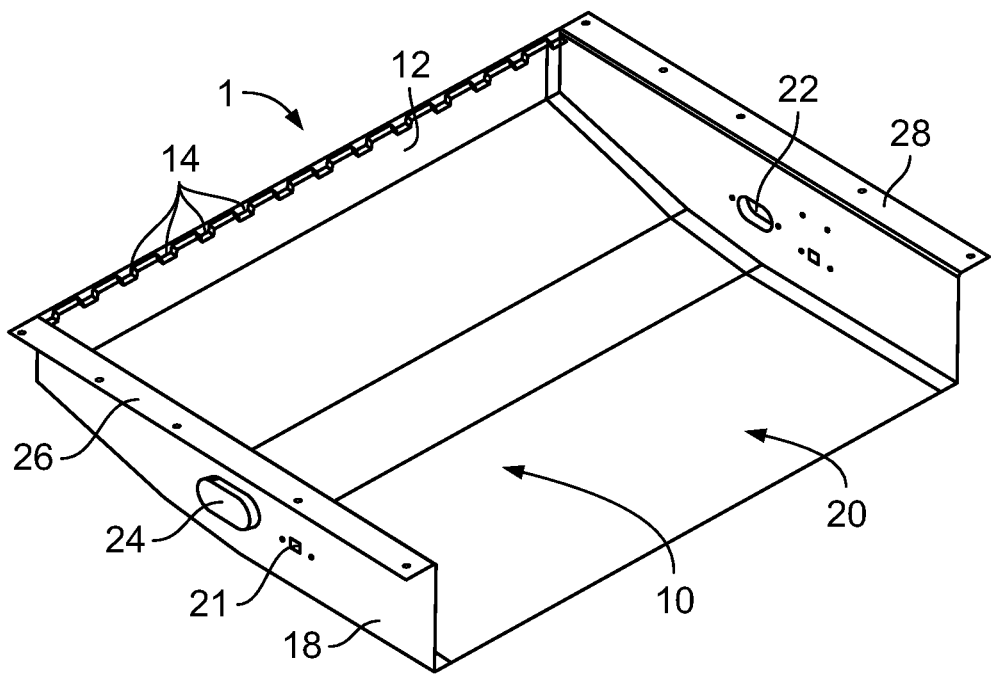
FIG. 3 is a perspective view, separately illustrating a framework belonging to the walkway assembly of FIG. 2.

As is shown in FIG. 3, the framework 1 firstly comprises a bottom 10 that extends transversally from the axis of travel to the vicinity of the door 106. This bottom is broadly inclined downwards, starting from this axis of travel to this door. On the interior side, i.e. in vicinity of the axis XX, the bottom 10 is bordered by an inside wing 12. In its upper part, this wing is supplied with a plurality of eyelets 14, protruding transversally towards the outside. These eyelets are mutually spaced out, in the axis of travel, so as to cooperate with other eyelets respectively equipping the intermediate structure and the swiveling floor.

Moreover, two flanks, respectively a front flank 16 and a rear flank 18, extend starting from bottom 10. Lastly, on the exterior side, i.e. in the vicinity of the door 106, the framework 1 delineates a lateral opening 20, allowing the passage of a ramp, made up of the sliding system in the deployed state, as well as by the swiveling floor, as will be seen hereafter. Each flank is equipped with a respective oblong-shaped accommodation 22 and 24, which protrudes towards the outside. Each accommodation, the bottom of which is closed, is intended to cooperate with a transmission lever described hereafter. Lastly, each of these flanks is extended by a respective edge 26 and 28. Each edge ensures the fastening of the framework to the body of the vehicle. This fastening is ensured by any, per se, known appropriate means. A removable fastening, in particular a screw connection, is preferred.

Figure 4:
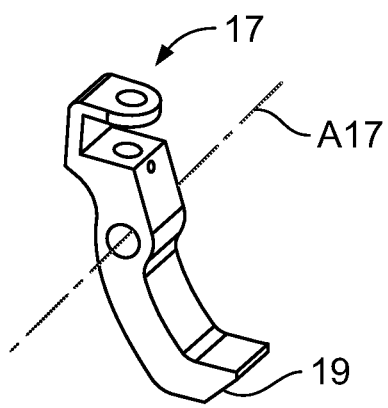
FIG. 4 is a perspective view, illustrating a locking hook, belonging to the framework of FIG. 3, in an isolated manner.
Figure 5:
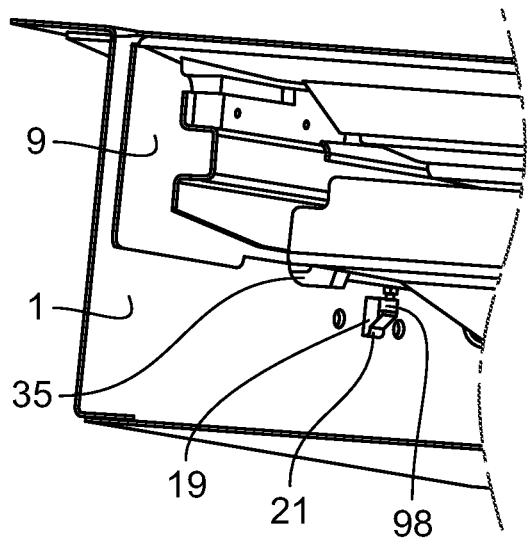
FIG. 5 is a perspective view, illustrating the locking hook from FIG. 4 from another angle, in a position where it allows the locking of the movable floor and of the surrounding pieces in relation to the framework, belonging to the walkway assembly according to the inventive subject matter.
Figure 6:
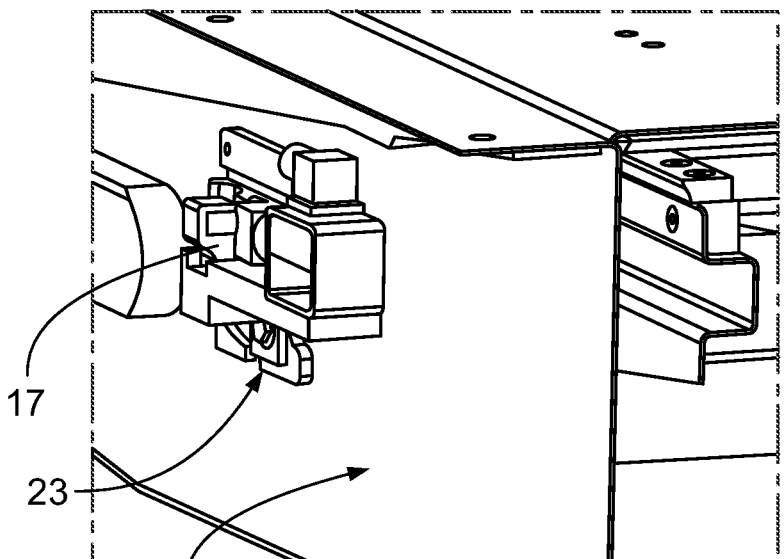
FIG. 6 is a perspective view, illustrating from the outside of the framework, the hook of FIG. 4 and FIG. 5, as well as an actuator of this hook.

Each flank 16 and 18 is equipped with a locking hook, of which only one 17 is visible in FIG. 4 to FIG. 6. This hook is mounted so that it can swivel about an axis A17, parallel to the main direction of the flank on which it is installed. It possesses, in particular, a hooking end 19, able to penetrate into an indentation 21 supplied in flank 16. This hook is able to be activated by any appropriate type of actuator 23, in particular an electromagnetic actuator.

Figure 7:
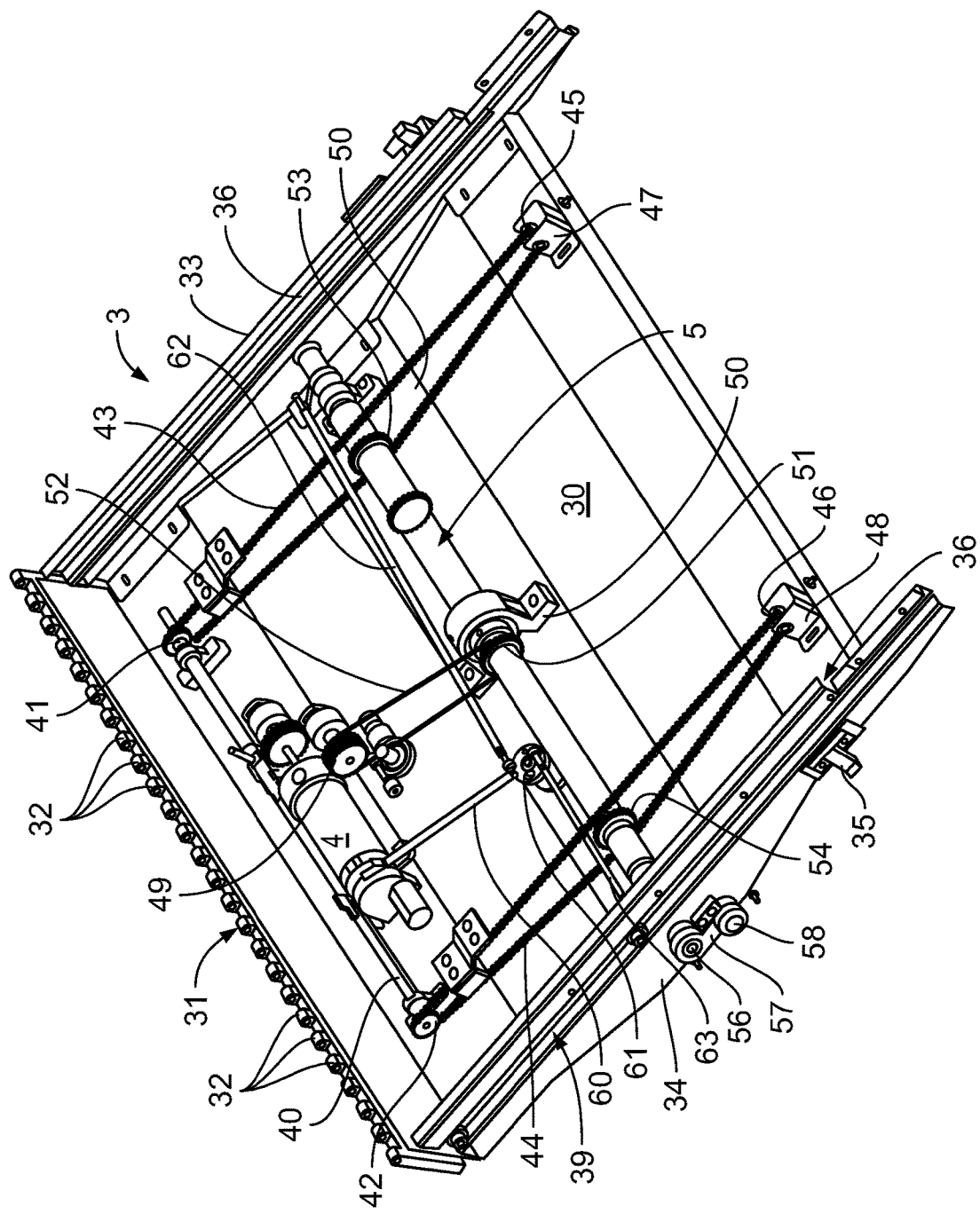
FIG. 7 is a perspective view, separately illustrating an intermediate device belonging to the walkway assembly of the preceding figures.

In particular reference to FIG. 7, the intermediate device 3 firstly comprises a bottom 30 that extends transversally, largely parallel to the aforementioned bottom 10. This bottom 30 is inclined, starting at each of its lateral ends, in the direction of its middle portion which is located at a lower height. On the interior side, this bottom 30 is bordered by a wing 31, which is supplied with a plurality of eyelets 32. These eyelets protrude upwards, so as to be interposed between the adjacent eyelets 14, while at the same time providing passages to receive eyelets of the swiveling floor, described hereafter.

Lastly, two flanks, respectively front 33 and rear 34, extend starting from the bottom 30. These flanks 33 and 34 are located facing the interior face of a corresponding flank 16 and 18, belonging to the framework 1. As shown in FIG. 5, each flank is equipped with a joining tab, of which only one 35 is illustrated. As will become clear from that which follows, the tab allows for the intermediate device 3 and the swiveling floor 9 to be joined with one another in only one direction.

The intermediate device 3 is moreover equipped with a propulsion, designated as a whole by reference number 4. This propulsion, provided on the interior side, i.e. in the vicinity of wing 31, is fastened on the bottom 30 using any appropriate means. This propulsion is of the traditional type, in particular a rotary electric propulsion, so that it will not be described in more detail hereafter.

A shaft 40 is driven in rotation by the aforementioned propulsion 4 about a longitudinal axis, i.e. substantially parallel to axis XX. The ends of this shaft receive gears 41 and 42, which allow for the driving of the respective chains 43 and 44. At their ends opposite to the shaft 40, these chains cooperate with additional gears 45 and 46, which themselves are mounted in a swiveling manner on respective flanges 47 and 48.

The intermediate device 3 furthermore comprises a main shaft 5, called a transmission shaft, which extends longitudinally, while being fastened on the middle portion of the bottom 30. This shaft, which is mounted on bearings 50, is equipped with a transmission crown gear 51. This transmission crown gear activated by means of a toothed chain or similar 52, by a driving crown gear 49, which directly cooperates with propulsion 4. Moreover, gears 53 and 54 are mounted as idler gears around the shaft 5. During operation, when chains 43 and 44 are put in action, they cause these gears 53 and 54 to swivel without however driving the shaft 5 in an uncontrollable manner, nor damaging it.

Figure 8:
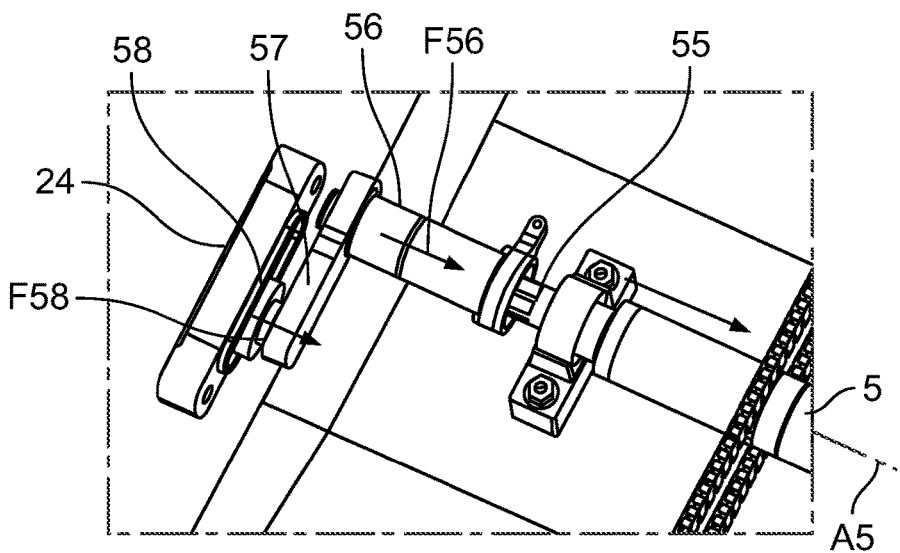
FIG. 8 is a perspective view, illustrating in the largest scale, the end of a transmission shaft belonging to the intermediate device of FIG. 7, as well as lever cooperating with this shaft.

Each end of shaft 5 possesses a fluted portion, of which one 55 is visible in FIG. 8. This portion 55 cooperates with a respective barrel 56, which is likewise shown in FIG. 8. This portion 55 and barrel 56 are connected in rotation about the main axis A5 of shaft 5, but they do nonetheless possess a certain mutual degree of freedom in translation on this main axis A5. This barrel 56 penetrates in an opening set up in the respective flank 33, 34, and then extends by a lever 57 which itself ends with a roller 58. As will be seen hereafter, this roller allows for the selective swiveling in relation to the framework 1, either of the intermediate device 3, or of the swiveling floor 9.

Propulsion 4 is moreover able to drive a rod 60, for example, thanks to its swiveling stator. This rod allows the swiveling of a disk spacer 61, which, in turn, drives the placement in translation of the connecting rods 62 and 63 which largely extend along the main axis of the shaft 5, in opposite directions. At their end opposite to disk 61, each connecting rod is consolidated on a respective barrel, like reference 56 of FIG. 8 and FIG. 26. As a consequence, the mobilization of the rod allows, via the disk and the connecting rods, the placement in translation of each barrel in relation to the shaft 5.

At its exterior lateral end, that neighbors door 106, each flank 33 and 34 is supplied with a respective slide, of which only one 36 is illustrated in FIG. 7. As can be seen in larger scale in FIG. 9, the walls of the slide 36 are extended towards the exterior and towards the front, by a cam surface 37. Moreover, these walls are likewise extended by a transition 38, that is inclined upwards in the direction of the exterior.

Figure 10:
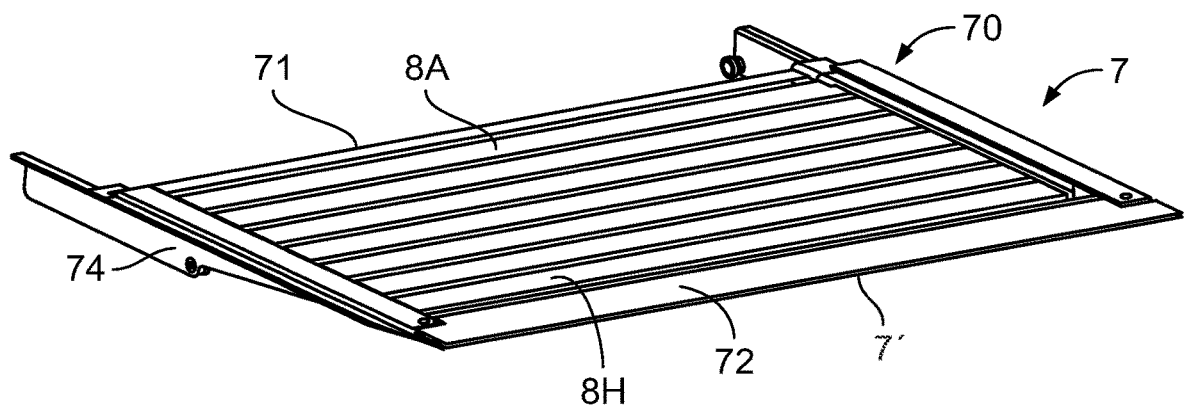
FIG. 10 is a perspective view, separately illustrating a sliding system belonging to the walkway assembly of the preceding figures.
Figure 11:
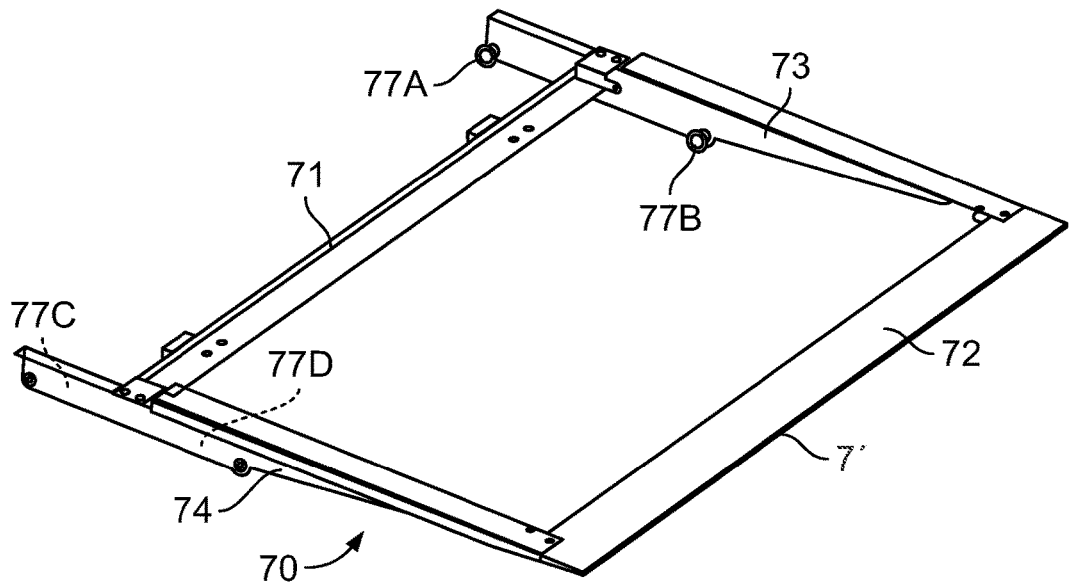
FIG. 11 is a perspective view, illustrating a frame belonging to the sliding system of FIG. 10.
Figure 12:
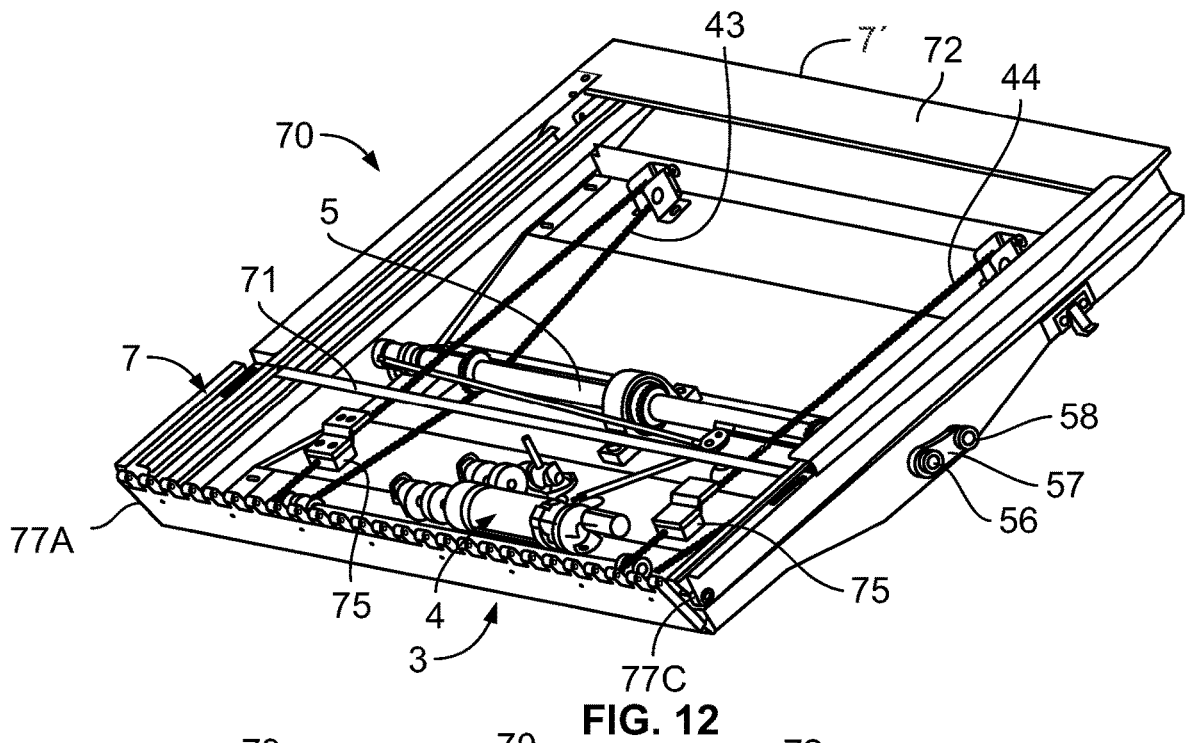
FIG. 12 is a perspective view, illustrating the frame of FIG. 11 from an angle that is different from that of FIG. 10 and FIG. 11, mounted on the intermediate device of FIG. 7.

As shown in FIG. 10 and FIG. 11, the sliding system 7 firstly comprises a frame 70, formed by side bars, respectively interior 71 and exterior 72, as well as the cross pieces, respectively front 73 and rear 74. As shown in FIG. 12, the interior side bar 71 is supplied with two mechanical connectors 75, which are east fastened on a chain, respectively 43, 44. The fastening of each connector on each chain is achieved in a known manner, in particular, by pinching at least one link of each chain thanks to parts belonging to the respective connector.

Figure 9:
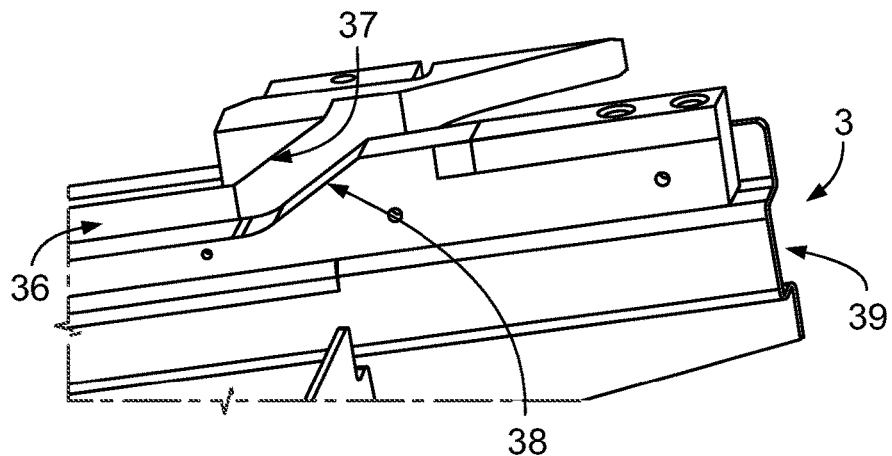
FIG. 9 is a perspective view, illustrating a slide provided for in a flank of the intermediate device of FIG. 7 and FIG. 8, in an isolated manner.

From the interior lateral side, adjacent to the axis of travel XX, each cross piece 73, 74 is equipped with a respective roller 77A to 77D. Each roller ensures the translation of the sliding system 7 in relation to the intermediate device 3, by rolling in a groove, of which only one 39 is illustrated in FIG. 7, which is fitted in a respective flank of this device 3. In FIG. 9, this groove 39 is represented in a larger scale.

Figure 13:
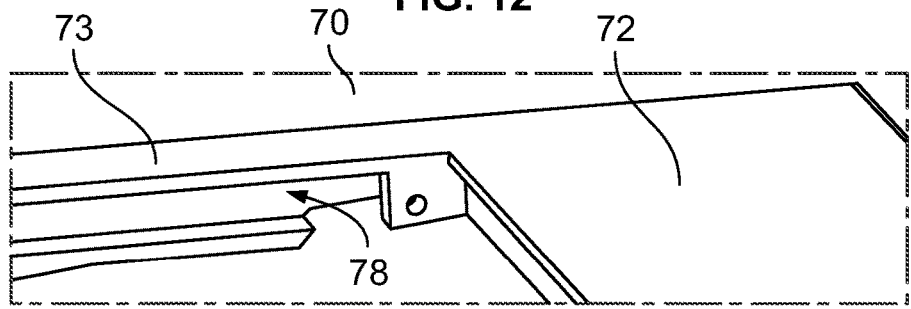
FIG. 13 is a perspective view, illustrating a slide provided in the frame of FIG. 11 and FIG. 12 in an isolated manner.

On the exterior lateral side, each cross piece is equipped with a slide 78, visible in FIG. 13. When the sliding system 7 is mounted on the intermediate device 3, as is in particular visible in FIG. 12, each slide 78 is located at a height higher than that of each slide 36, as is in particular shown in FIG. 15. Moreover, each slide 78 is staggered towards the exterior, when compared to a respective slide 36. This avoids the overlapping of the slides 36 and 78, and therefore, any interference.

Figure 14:
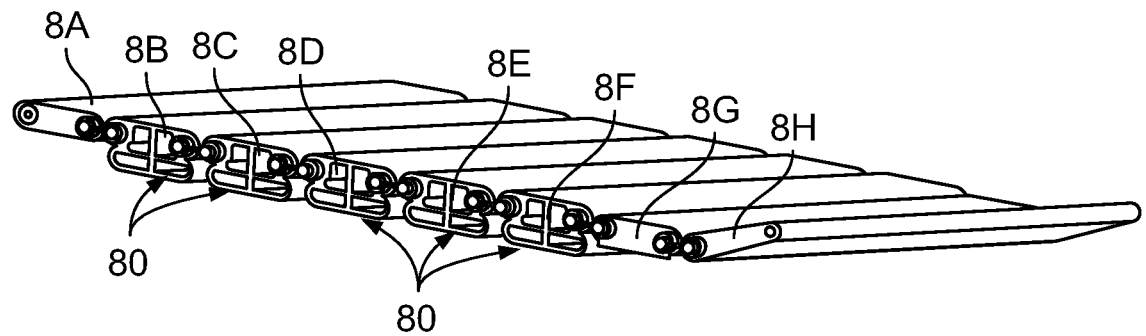
FIG. 14 is a perspective view, separately illustrating a succession of blades belonging to the sliding system of FIG. 10.
Figure 15:
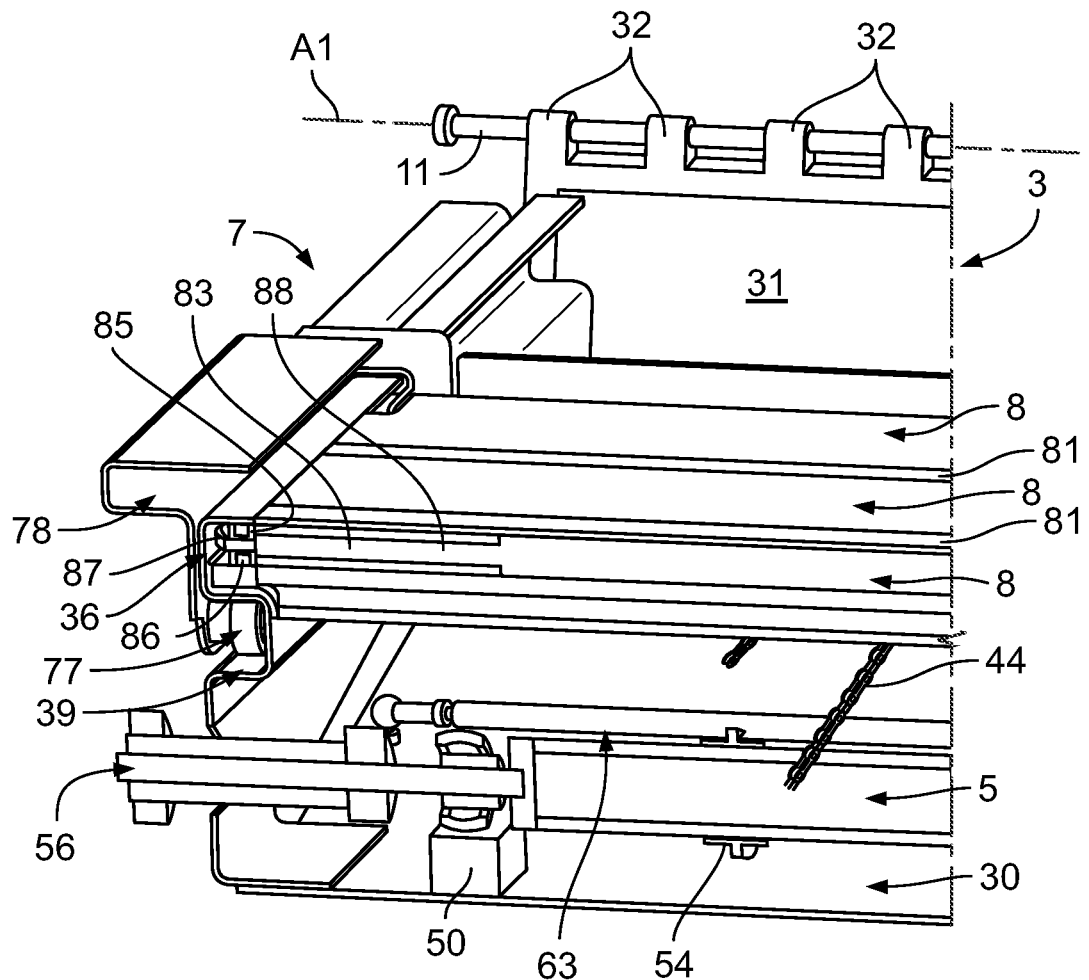
FIG. 15 is a cross-sectional view, taken along the main axis of a shaft belonging to the intermediate device, illustrating, in particular, the slides equipping this intermediate device and the sliding system, belonging to the walkway assembly according to the inventive subject matter.

In particular reference to FIG. 14, the sliding system 7 comprises, beyond the aforementioned frame 70, a plurality of blades that are articulated two by two about an axis, which is parallel to each of the longitudinal axes of these blades. Starting from the interior lateral end, there are successively a so-called first blade 8A, many so-called main blades 8B to 8F, with five blades being provided in the example illustrated, an intermediate blade 8G as well as a final blade 8H. As is in particular shown in FIG. 18, the first blade 8A is placed in the vicinity of the interior cross bar 71, whereas the final blade is placed in the vicinity of the exterior side bar 72.

Figure 27:
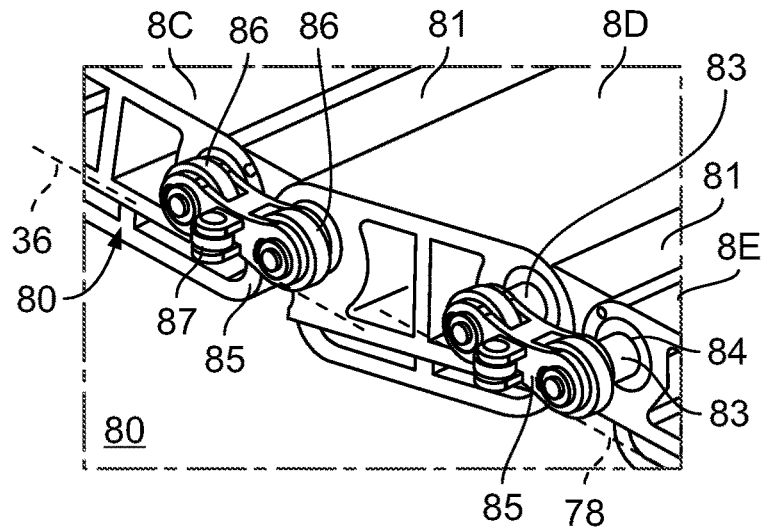
FIG. 27 is a perspective view, illustrating, from another angle, in the largest scale, the positioning of the blades along this slide.

The main blades are equipped with an elevation 80, in particular visible in FIG. 14 and FIG. 27, such that they possess a height that is greater than those of the other blades. Furthermore, each couple of adjacent blades is linked by means of a junction profile 81, typically made of plastic material or of an elastomer. This junction profile has two semi-circular convex opposing lateral surfaces, each of which cooperates with the respective semi-circular concave flank 82 facing a blade.

Furthermore, as is shown in FIG. 27, each couple of adjacent blades is articulated by means of stems 83. More precisely, each of the stems is received in an open-ended accommodation 84, formed at the end of each blade. These stems are movable in rotation about their main axis in relation to the blades, while likewise being movable in translation in relation to these blades, according to this axis.

The end of each stem, opposite to accommodation 84, penetrates in the respective clevis of a carriage 85. Each stem is movable in rotation about its axis in relation to this carriage, while at the same time being united with the carriage in translation. This carriage has two support rollers 86, which are able to swivel about the main axis of a respective stem, as well as a guidance roller 87 which is able to swivel about a vertical axis. Lastly, compression springs 88, which are illustrated in a schematic way, tend to repel each stem opposite each blade end.

Figure 16:
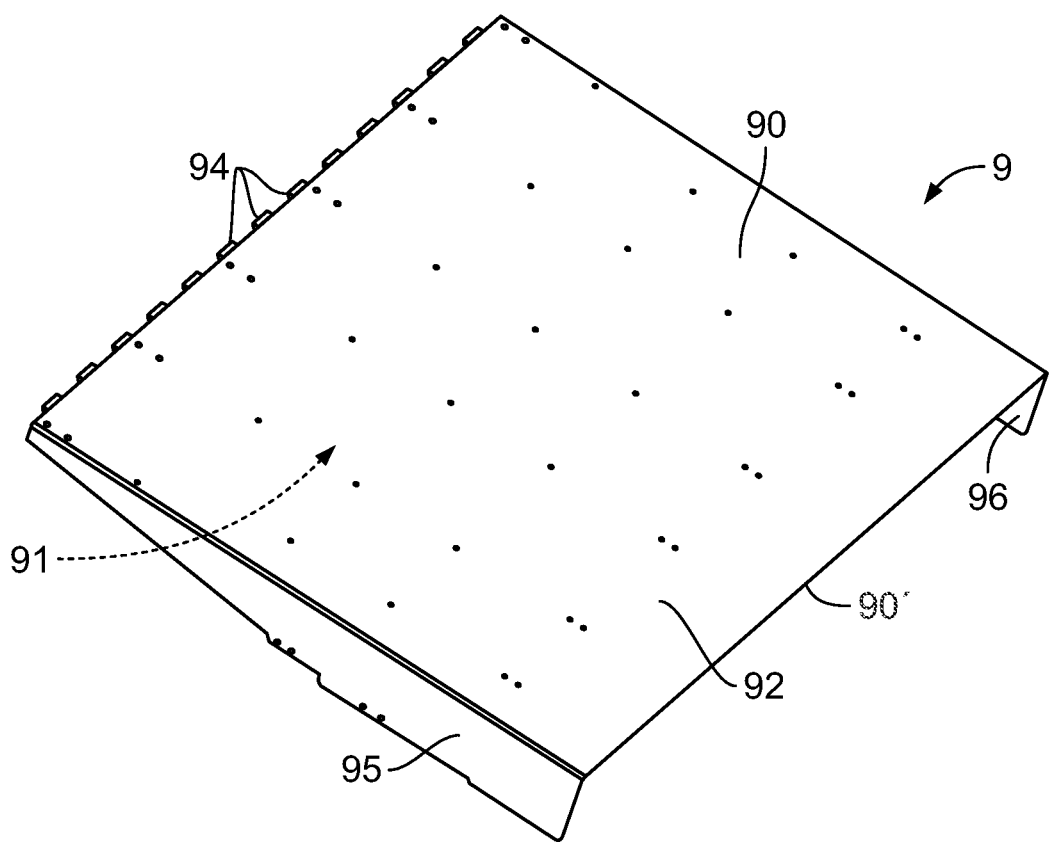
FIG. 16 is a perspective view, separately illustrating a swiveling floor belonging to the walkway assembly according to the inventive subject matter.

As is, in particular, visible in FIG. 16, the swiveling floor 9 firstly has a plate 90, which forms a movable floor for forward motion, which extends transversally starting from the axis of rotation all the way to the vicinity of the door. On its lower face, as is, in particular, shown in FIG. 19, this floor 90 is made more rigid by a reinforcement 91. The reinforcement extends, starting from the internal lateral end of this floor, only over a transverse part of the floor. Indeed, this floor has a metal plate 92 that forms a tapered end that has no reinforcement.

The reinforcement 91 and the tapered end 92 delimit a step 93, at which point the blades 8 of the sliding system switch into operation, as will appear hereafter. This end metal plate 92 has a thickness that is substantially thinner than that of the reinforcement, typically being close to 6 mm. Moreover, the reinforcement 91 has a dimension L91, which is substantially greater than the dimension L92 of the tapered end 92.

On the interior side, the floor 90 is extended by a plurality of eyelets 94, which protrude transversally towards the interior. These eyelets are mutually spaced out, along the axis of travel, in such a way as to cooperate with the aforementioned eyelets 14 and 32. A physical swiveling axis, which is more specifically visible in FIG. 15 where it is given the reference 11, extends on the interior of the holes supplied in the set of these eyelets 14, 32 and 94.

This physical axis 11 defines the geometric swiveling axis A1, which is a feature of the assembly 1 according to the inventive subject matter. Advantageously, this characteristic axis A1 extends substantially at the same height as the fixed floor of the train, in such a way as to ensure continuity of the surfaces without a step between the fixed floor and the movable floor 90. Lastly, two flanks, respectively front flank 95 and back flank 96 extend the floor 90 downwards, while being parallel to flanks 16 and 18, as well as flanks 33 and 34 described hereafter.

Figure 17:
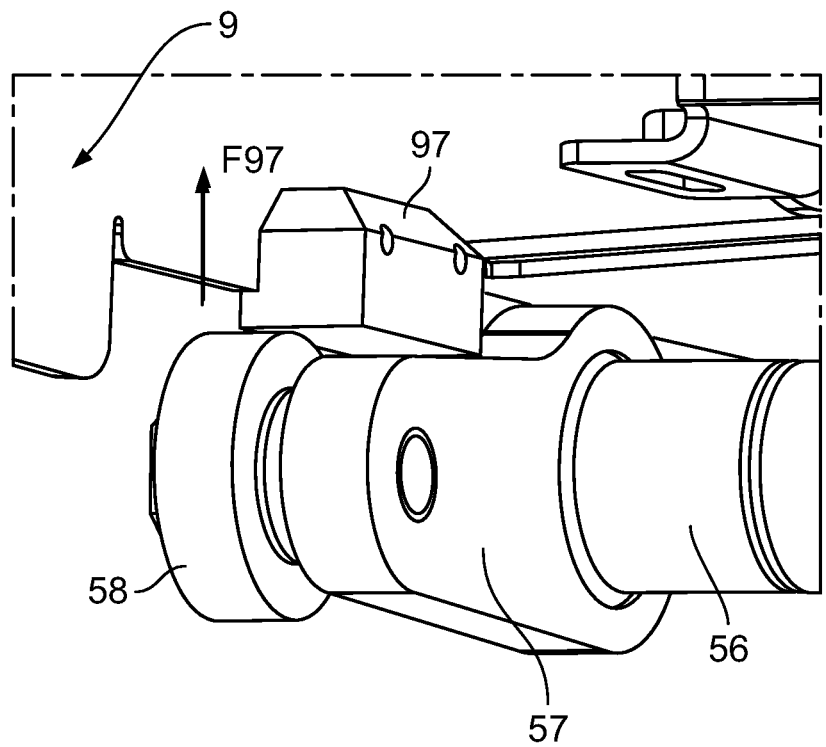
FIG. 17 is a perspective view, illustrating the bearing pads belonging to the swiveling floor of FIG. 16 in an isolated manner.

Each of the flanks 95 and 96 is supplied with a bearing pad, of which only one 97 is shown in FIG. 17. Each pad is provided facing the accommodation 22, supplied in the flank adjacent to the intermediate device 3. As a consequence, as we will see hereafter, each of the pads is able to cooperate with a respective lever 57, borne by the transmission shaft 5. Each flank is moreover supplied with a hooking pin, of which only one 98 is shown in FIG. 5. Each of these pins is able to cooperate with the free hooking end, belonging to previously described hook 17.

Figure 18:
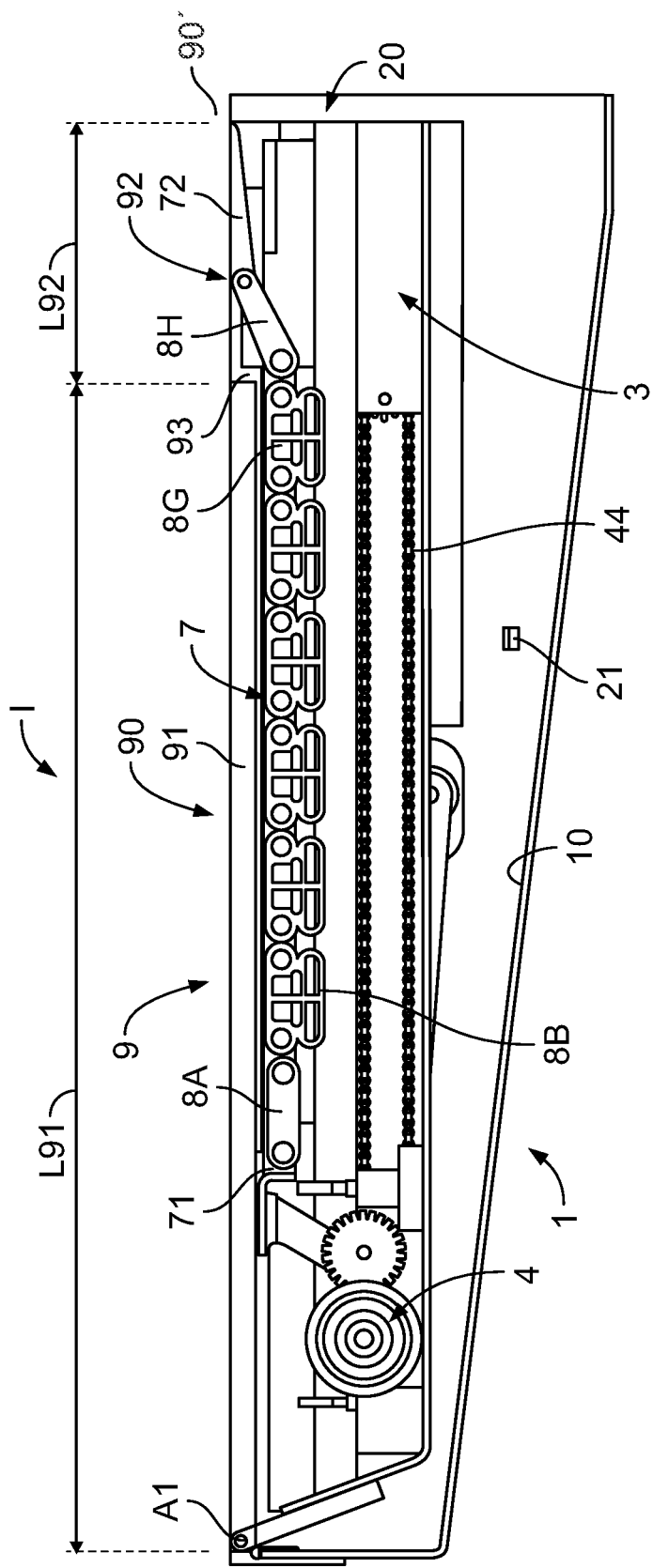
FIG. 18 is a longitudinal cross-sectional view, illustrating the entirety of the walkway according to the inventive subject matter in the stowed position of its sliding system, with all inclinable parts positioned in a horizontal manner.
Figure 20:
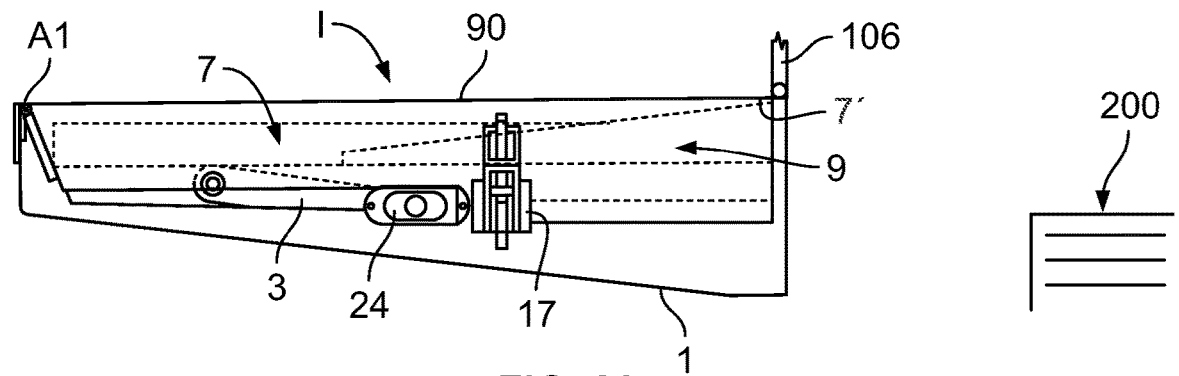
FIG. 20 is a side view, illustrating a transport vehicle equipped with a walkway assembly according to the inventive subject matter, facing a train/bus platform the height of which is lower than that of the fixed floor of this vehicle.

The implementation of the transport vehicle 100, equipped with the previously described walkway assemblies I and I', will now be elucidated. In FIG. 18 and FIG. 20, the walkway assembly I is in the so-called resting position, corresponding to normal travel of the transport vehicle. In this position, the surface for forward motion 90 of the swiveling floor 9 comes flush with the fixed floor 104 of the body, with the latter not being represented in FIG. 17.

Moreover, with the exception of final blade 8H, the different blades 8A to 8G of the sliding system 7 are received in the slide 36 of the intermediate device. These blades 8A to 8G thus extend below the reinforcement 91, provided on the lower face of the movable floor. The guidance rollers 87, belonging to these blades, bear against the lateral wall facing a respective slide 36. The aforementioned final blade 8H is itself received in transition 38, extending slide 36, which is to say that this blade is positioned in an upwardly inclined manner, in the direction of the exterior side bar 72.

It is furthermore assumed that the transport vehicle 100 is immobilized facing a train/bus platform, illustrated as a whole in a schematic manner in FIG. 20 with reference 200. According to a first implementation possibility of the inventive subject matter, represented on this figure, the surface of the train/bus platform is located below the upper surface of the movable floor 90. A sensor, that is not represented, then measures, in a manner that is per se known, the respective horizontal and vertical distances separating the free edge 7' of the sliding system, in relation to the end facing the train/bus platform. A computer, that is likewise not represented, determines, on the basis of this measurement, the incline of the sliding system that is needed for it to come to bear on the train/bus platform at the end of a deployment action. It is also possible to provide that, at the end of a deployment action, the sliding system is no longer bearing upon the train/bus platform, but rather facing this train/bus platform and above the same.

In order to incline the sliding system to a desired value, it is firstly assumed that each roller 58, provided at the end of a respective lever 57, is engaged with a respective accommodation 22 and 24 of the framework. It is then required that the propulsion 4 is started up in such a way that the crown gear 49 drives the chain 51 and as a consequence the main shaft 5. Each roller hereby bears against the walls of a respective accommodation. Thanks to the lever arm that is achieved by the levers 57, this support of the roller drives the swiveling of the intermediate device 3 in relation to the framework 1 about the characteristic axis A1, according to arrow F3 in FIG. 21.

It will be noted during the swiveling of the intermediate device in relation to the framework, that the hook 17 is kept in its active position. In other words, its end 19 enables support of the swiveling floor 9, by means of the pin 98, as is in particular shown in FIG. 5. As a consequence, this swiveling floor 9 is firmly held in position in relation to framework 1, even if it no longer bears upon the intermediate device 3. Moreover, the tab 35, which is borne by this intermediate device 3, is inactive with respect to the swiveling floor. In other words, when this device 3 swivels downwards, this does not drive any swiveling of the body 9.

Figure 22:
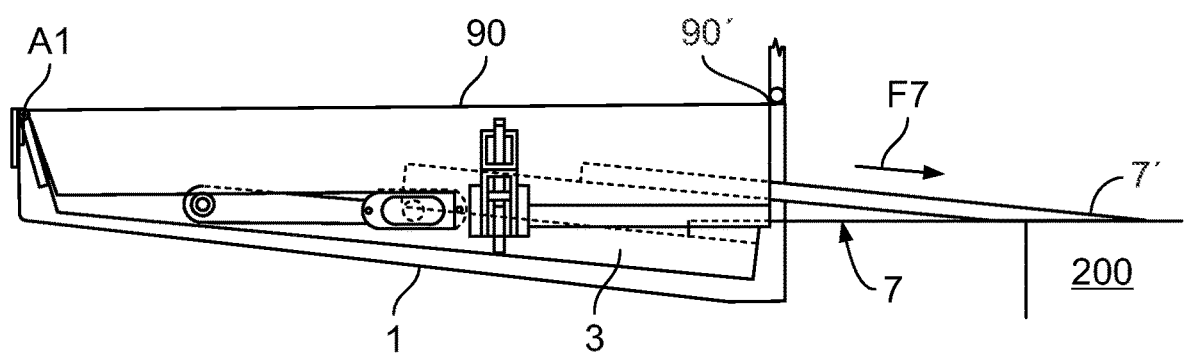
FIG. 22 is a side view, analogous to FIG. 20 and FIG. 21, illustrating a second step of the implementation.
Figure 23:
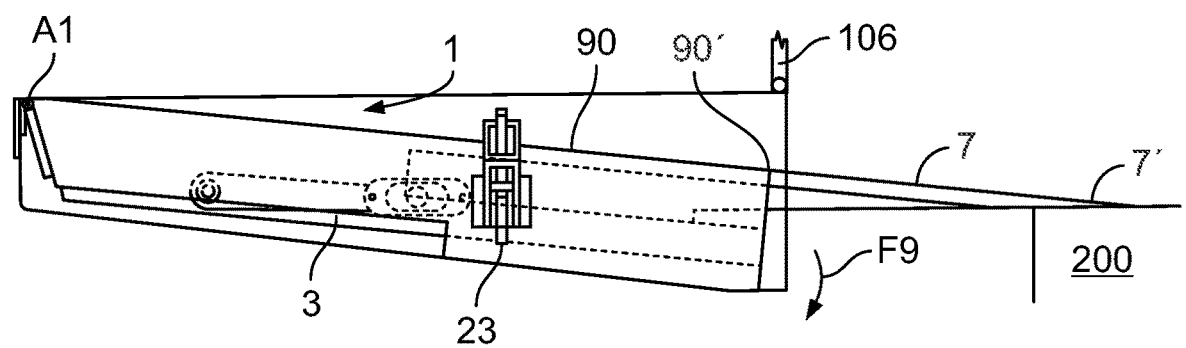
FIG. 23 is a side view, analogous to FIG. 20, and FIG. 22, illustrating a third step of the implementation.

When the desired incline is reached, in relation to the framework 1, as well as at the same time in relation to the intermediate device 3 and to the sliding system 7, the rotation of the transmission shaft 5 is stopped. Then, the toothed chains 43 and 44 are actuated, in such a way to displace the sliding system 7 in translation in relation to the intermediate device 3. This translational activation, which is shown in FIG. 22 by arrow F7 allows the free edge 7' of the sliding system to bear upon the upper surface of the train/bus platform, as is illustrated in this same figure. As a non-representative variant, as explained here above, upon conclusion of the translational activation, the free edge of the sliding system can find itself facing the train/bus platform, above the upper surface of the train/bus platform.

As seen here above, the sole propulsion 4 ensures multiple functions. It firstly involves the driving of the shaft 5, via the crown gear 49 and the chain 51. An additional function consists in the driving of the sliding system 7, by the chains 43 and 44. Lastly, the propulsion allows the driving of the levers 57, through the rod 60 as well as the connecting rods 62 and 63. In this respect, it will be noted that this feature is advantageous, in particular, in terms of simplicity, inasmuch as a single propulsion assembly ensures the accomplishment of different functions.

The distribution of the power generated by this propulsion, for the above functions, is advantageously managed by electro-brakes or similar, which are mounted on different shafts located upstream of the propulsion. It will likewise be noted that the stability of the sliding system is obtained, advantageously due to the fact that the sliding system is displaced by means of an irreversible gearing. Moreover, the stability of the incline both of the swiveling floor and of the intermediate device is likewise guaranteed by the use of an irreversible gearing.

Figure 24:
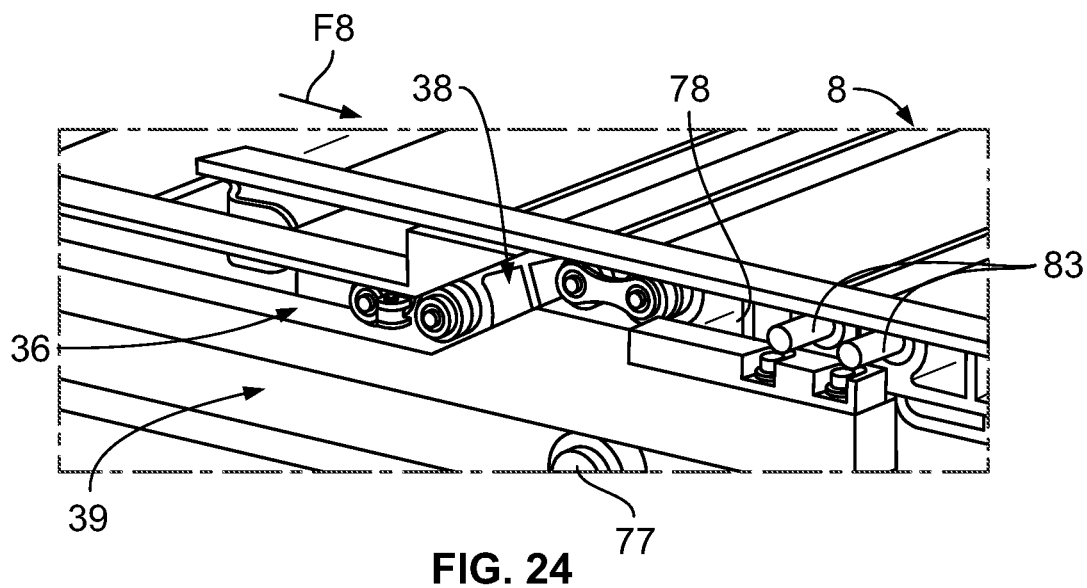
FIG. 24 is a perspective view, illustrating the positioning of the blades of the sliding system, along the slides belonging to the intermediate device and to the sliding system.

FIG. 24 and FIG. 27 moreover illustrate the switching of the blades 8, during the translational movement of the sliding system in relation to the intermediate device. As has been seen here above, when the sliding system is stowed, apart from the final blade, the whole of the blades are located below the reinforcement 61. As the movement of the sliding system 7 in relation to the intermediate device 3 advances, the different blades likewise move in relation to the intermediate device according to the arrow F8 in FIG. 24 and FIG. 25.

As a consequence, these blades firstly reach the exterior end of the lower slide 36, which is to say its end opposite the axis A1. These blades then progress both along the length of the transition 38 and of the cam 37, according to the arrow F37, until they reach the upper slide 78. Given that the upper slide is located on the exterior of the slide 36, the stems 83 are pushed back by the effect of the springs 88 opposite the blades that they receive (see arrow F87 in FIG. 24).

Figure 25:
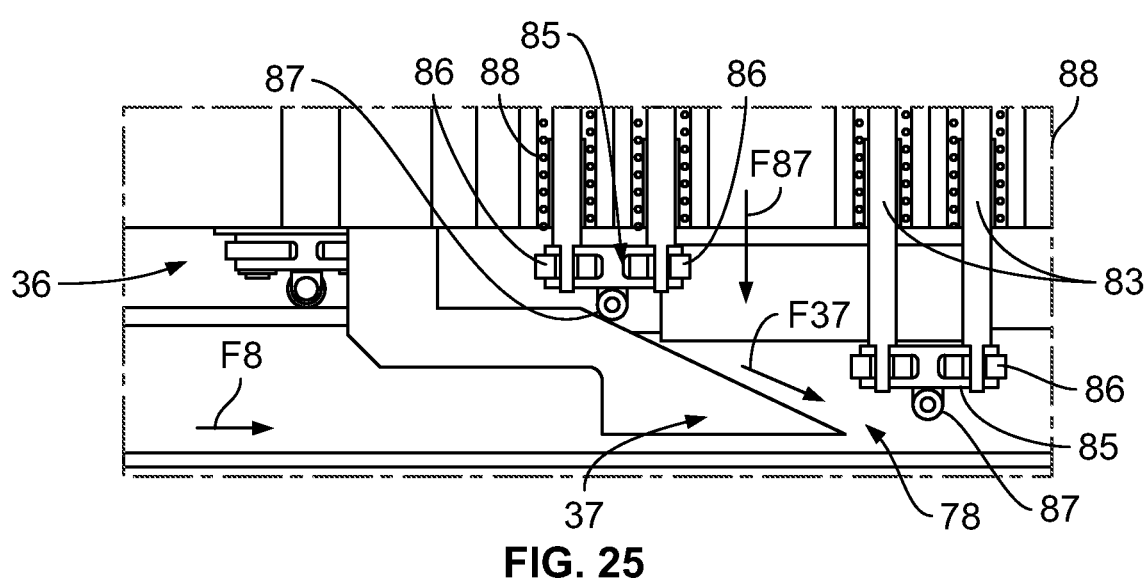
FIG. 25 is a top view, illustrating the movement of the blades of FIG. 24 during their passage from lower slide towards the upper slide.
Figure 26:
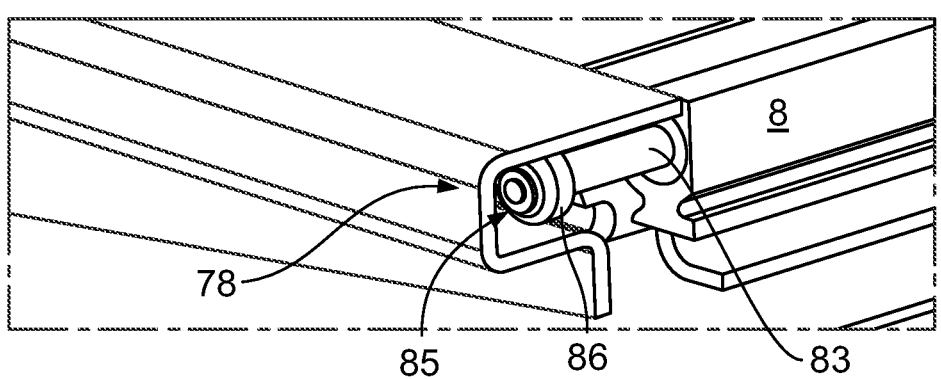
FIG. 26 is a perspective view, illustrating the positioning of the blades in the upper slide.

Each guidance roller 87 then bears against the lateral surface facing a respective slide 78, as is shown in FIG. 25 and FIG. 26. FIG. 27 more clearly illustrates the position of the blades and of the carriages which are associated with them, both in slide 36 as well as in slide 78. In FIG. 27, for clarity, these slides are not represented, with their lower surface being depicted by dotted lines.

Once the sliding system has been placed in its desired position, the swiveling floor 9 is swiveled in relation to the framework. For this purpose, hook 17 is first unlocked, using the actuator 23. Rod 60 is then moved, and then, making use of the disk spacer 61, the connecting rods 62 and 63 according to the arrows F60, F61, F62 in FIG. 26. This brings about a translational movement of the barrels 56, according to arrow F56 in FIG. 8, tending to extract the rollers 58 borne by the levers 57 from the accommodations 22 and 24, according to arrow F58 in the same FIG. 8.

At the end of this translational movement, the rollers 58 are henceforth placed in front of the pads 97 belonging to the swiveling floor 9, as is, in particular, shown in FIG. 16. The main shaft 5 is then made to swivel in a manner analogous to that which has been described here above, in order to lower every roller 58. Given that hook 17 has been unlocked, the swiveling floor 9 tends to lower due to gravity, being solely retained by rollers 58. The retaining force exerted by every roller 58 on a respective pad 97, is depicted by arrow F97 in FIG. 17. As a consequence, there is a rotation of the swiveling floor 9 in relation to framework 1 according to arrow F9 in FIG. 21.

Figure 19:
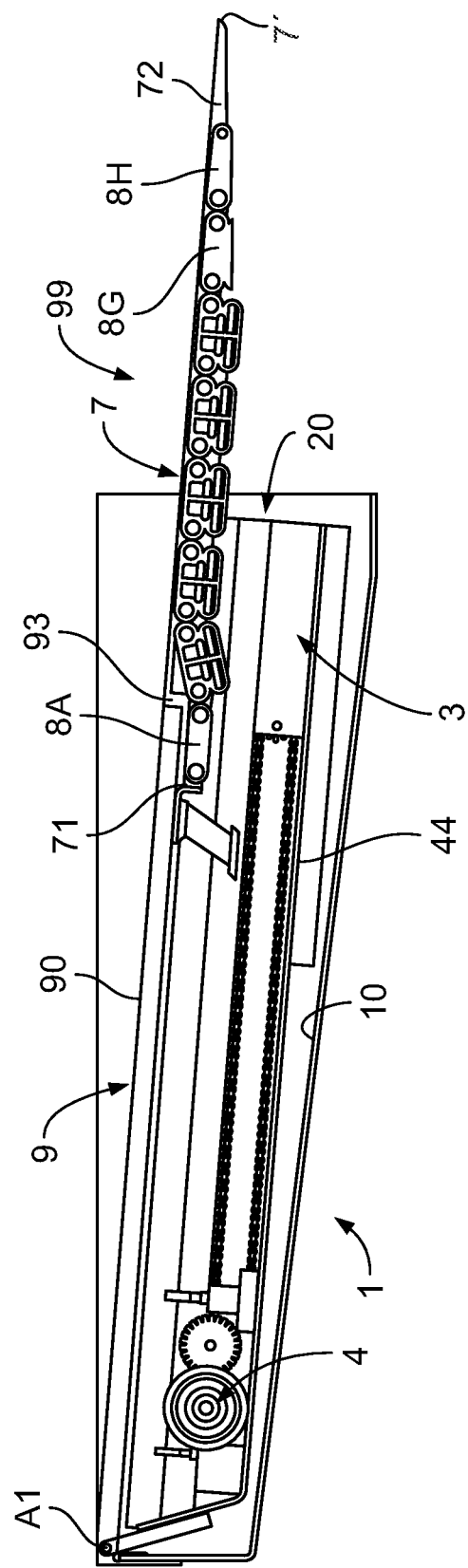
FIG. 19 is a longitudinal cross-sectional view, illustrating the entirety of the walkway assembly according to the inventive subject matter in the deployed position of its sliding system, with all inclinable parts positioned in an inclined manner in relation to horizontal.
Figure 21:
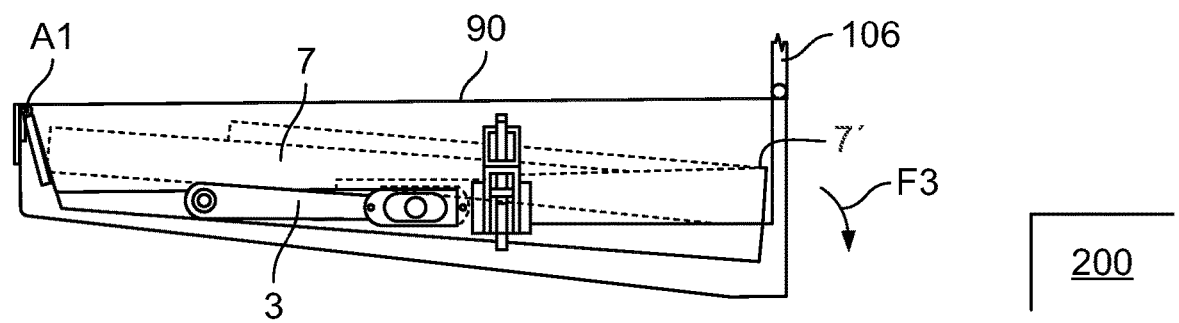
FIG. 21 is a side view, analogous to FIG. 20, illustrating a first step of the implementation of this vehicle.

This swiveling floor 9 is made to swivel until it is in contact with the upper end of the sliding system. At the end of this swiveling, as shown in FIG. 21 and FIG. 27, the blades 8D to 8H of the sliding system are now located in the extension of the free edge 90' of the surface for forward motion 90. In this configuration, FIG. 19 shows the formation of an access ramp belonging to the walkway assembly according to the inventive subject matter, which is indicated as a whole by reference 99. This ramp 99 is successively formed by the surface for forward motion 90, the blades 8D to 8H, as well as the profiles 81 which separate them two-by-two, and lastly by the side bar 72.

Lastly, the door 106 is opened in such a way as to allow the forward motion of the passengers along the aforementioned ramp 99. According to a particularly advantageous feature of the inventive subject matter, it should be noted that there is only a very slight vertical offset between the aforementioned free edge and the upper face of the blades. This offset substantially corresponds to the thickness of the thin metal plate 92, which, as noted, is typically close to 6 mm.

This feature allows for assurance of excellent continuity of surfaces between the floor and the sliding system, which is advantageous, in particular, in terms of comfort and safety, in particular for the users in wheelchairs. Moreover, it is possible to confer satisfactory mechanical properties to floor 90, due to the presence of reinforcement 91. It should be noted that this comfort and safety are, in particular, permitted, without however compromising on strength, thanks to the fact that the blades of the sliding system switch starting from the lower slide 36 in the direction of the upper slide 78, during the translational movement of the sliding system in relation to the intermediate device.

Figure 30:
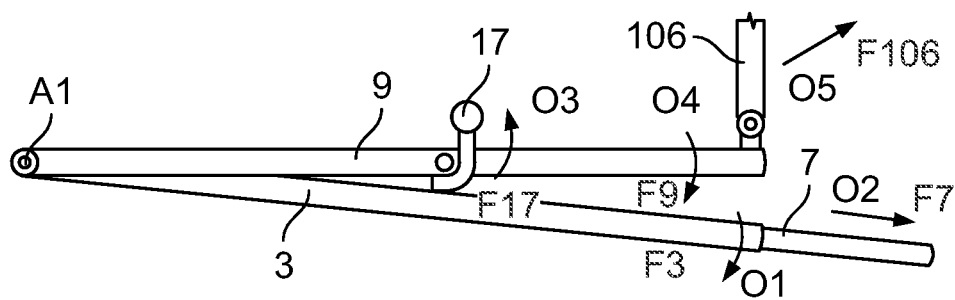
FIG. 30 is a schematic view, summarizing the different steps implemented during the deployment of the sliding system, when the facing train/bus platform is located at a lower height than that of the fixed floor of the vehicle.

FIG. 30 schematically summarizes the different steps, described here above, that permit the deployment of the sliding system 7. These steps include, successively, the downwards swiveling of the intermediate device according to arrow F3, the translational movement of the sliding system 7 opposite the intermediate device according to arrow F7, the unlocking of hook 17 according to arrow F17, the downwards swiveling of the swiveling floor according to arrow F9, and then, lastly, the opening of the door according to arrow F106. In this figure, these successive steps are indicated with references O1 to O5, with the letter "O" making reference to this opening phase.

Figure 28:
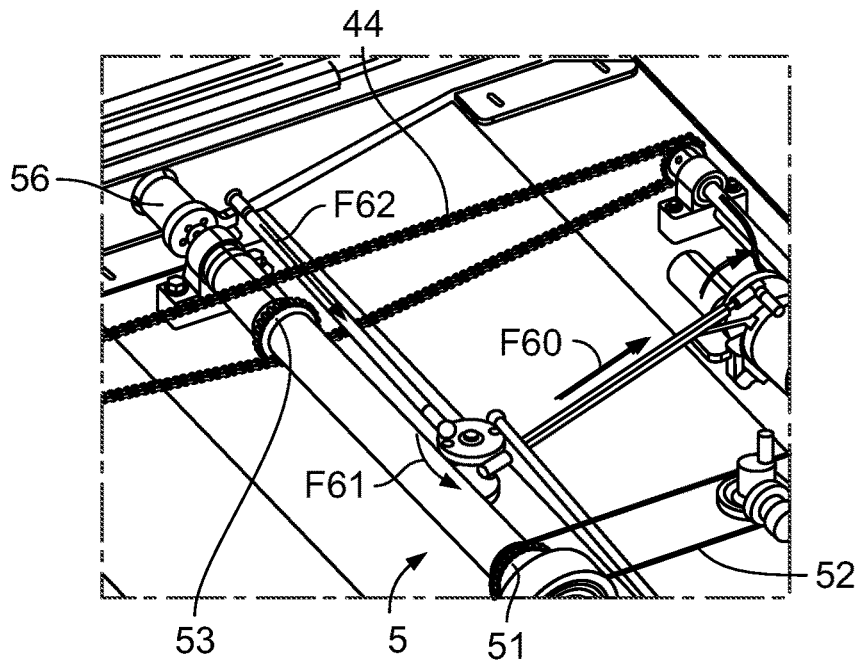
FIG. 28 is a perspective view, illustrating the displacement of bars and rods belonging to this intermediate device.
Figure 29:
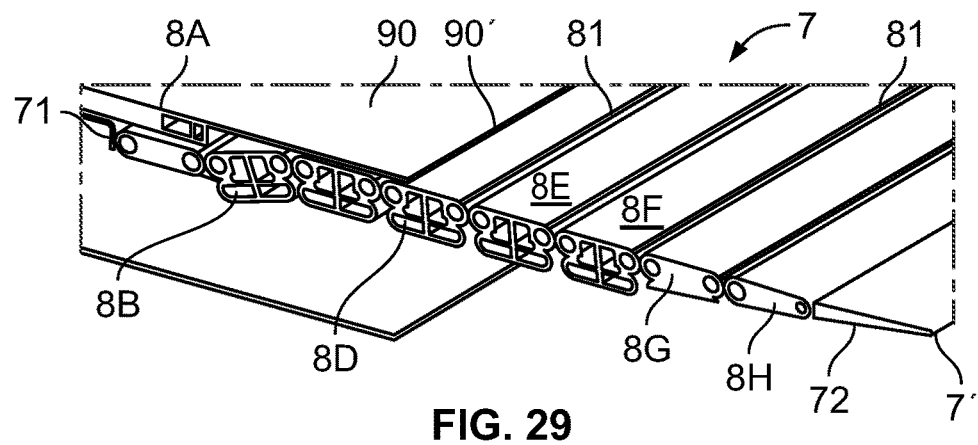
FIG. 29 is a perspective view, illustrating the sliding system in its deployed state in relation to the intermediate device.
Figure 31:
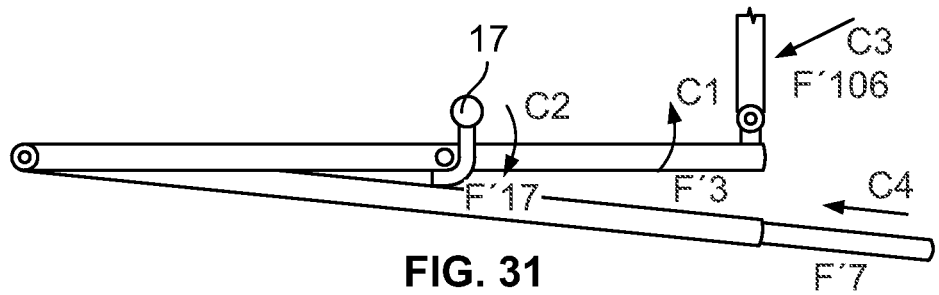
FIG. 31 is a schematic view, summarizing the different steps implemented during the stowing of the sliding system of FIG. 30.

FIG. 31 illustrates in a manner analogous to that which is shown in FIG. 28, the steps allowing the stowing of the sliding system 7, steps that are indicated with references C1 to C4. In this figure, the letter "C" refers to the closing phase. There are successively the upwards swiveling of the intermediate device according to arrow F'3, the locking of hook 17 according to arrow F'17, the closing of the door according to arrow F'106, and then lastly, the retraction of the swiveling floor in relation to the intermediate device according to arrow F'7.

Figure 32:
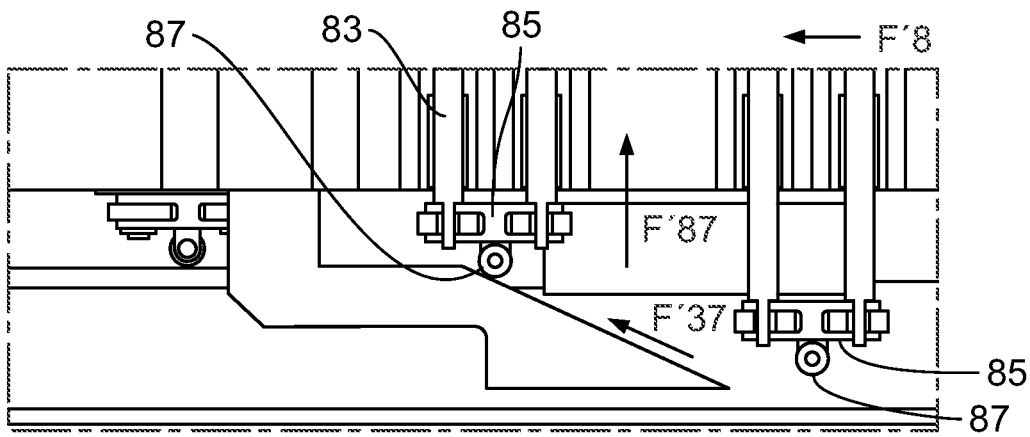
FIG. 32 is a top view, analogous to FIG. 25, showing the movement of the blades during this step of stowing.

During step C1, it can be noted that the upwards swiveling of the intermediate device 3 is accompanied by a corresponding swiveling of the swiveling floor 9. Indeed, during the upwards movement of the intermediate device 3, the tab 35 allows the solidarization of the swiveling floor in relation to this intermediate device. Moreover, during step C4, corresponding to the retraction of the swiveling floor, the movement of the blades and carriages is the inverse of that described in reference to FIG. 25. This inverse movement, illustrated in FIG. 32, causes an overall movement of blades 8 according to arrow F'8, as well as a sliding of the carriages along the cam 37, according to arrows F'37, which drives a translation of these carriages towards the interior of the accommodations of the blades according to arrow F'87.

According to a second possible implementation of the inventive subject matter, it is henceforth assumed that the surface of the train/bus platform 200 is located above the upper surface of the movable floor 90. In this case, as previously, a sensor measures the distance separating the free edge 7' of the sliding system, in relation to the end facing the train/bus platform. The previously-mentioned computer then determines, on the basis of this measurement, the desired incline of the sliding system. This incline ensures that, at the end of its deployment movement, this sliding system either comes to bear upon the train/bus platform, or ends up facing and slightly above the train/bus platform.

Figure 33:
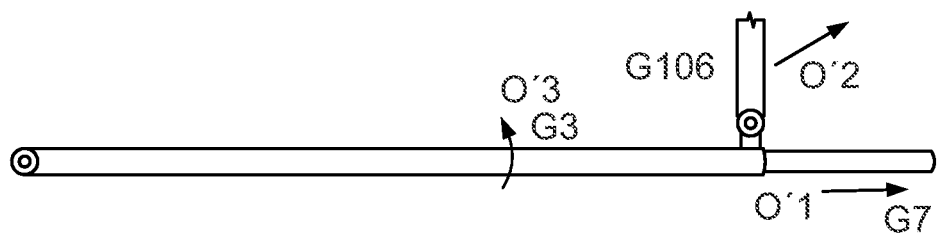
FIG. 33 is a schematic view, summarizing the different steps implemented during the deployment of the sliding system, when the facing train/bus platform is located at a higher height than that of the fixed floor of the vehicle.

FIG. 33 illustrates in a manner analogous to that which is shown in FIG. 30, the steps allowing the deployment of the sliding system 7, in this second implementation possibility, these steps indicated with references O'1 to O'3. In this FIG. 33, just like here above, the letter "O" refers to the opening phase. We successively find the translational displacement of the sliding system 7 opposite the intermediate device according to arrow G7, the opening of the door according to arrow G106, then lastly the upwards swiveling both of the intermediate device and of the swiveling floor according to arrow G3. In the same manner as is described here above, the upwards swiveling of the intermediate device drives the upwards driving of the swiveling floor, given the presence of tab 35.

Figure 34:
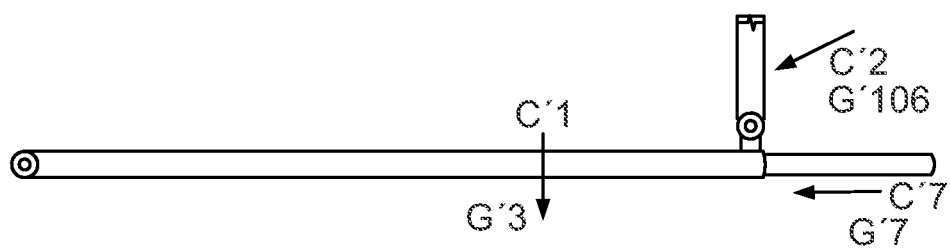
FIG. 34 is a schematic view, summarizing the different steps implemented during the stowing of the sliding system of FIG. 33.

FIG. 34 illustrates in a manner analogous to that which is shown in FIG. 31, the steps allowing the stowing of the sliding system 7 in this second implementation possibility, these steps being indicated with references C'1 to C'3. In this FIG. 34, just like here above, the letter "C" refers to the closing phase. We successively find the downwards swiveling both of the intermediate device and of the swiveling floor according to arrow G'3, the closing of the door according to arrow G'106 and then, lastly, the retraction of the swiveling floor in relation to the intermediate device according to arrow G'7.

The inventive subject matter brings about numerous advantages, when compared to the prior art mentioned in the recital of this description. In particular, it is to be underlined that the presence of the intermediate device 3 allows for the disadvantages, in terms of safety, linked to the teaching of EP 0 230 888 and DE U 2010 4221, presented here above, to be overcome. Indeed, thanks to this inventive subject matter, the movement of the sliding system can be separated from that of the floor for forward motion. As a consequence, it is possible to displace the sliding system, both in translation as well as in rotation, until reaching its final position against the train/bus platform, all the while maintaining the floor in a position that confers optimum safety for the passengers.

The inventive subject matter is not limited by the examples described and represented. Thus, in reference to FIG. 30, FIG. 31, FIG. 33 and FIG. 34, a sliding system 7, the free edge 7' of which is in contact with the train/bus platform 200, is represented. In these conditions, this train/bus platform therefore forms a fulcrum in view of the swiveling both of the sliding system 7, as well as of the intermediate device 3. As a variant that is not represented, it is possible to have a sliding system that, in contrast, does not bear upon the train/bus platform. In this case, the swiveling between this sliding system 7 and this intermediate device 3 is, for example, permitted through either an active or inactive mechanical locking that is not represented. The mechanical locking is, for example, controlled electrically, being placed between the fixed framework and the intermediate device.

Furthermore, in the described and represented example, the sliding system 7, comprising among others the mutually articulated blades 8, is associated with the intermediate device 3. As a variant that is not represented, it is possible to have a walkway assembly, equipped by these blades, of a different type than the one described and represented here above. With this in mind, such a walkway assembly can in particular be free of an intermediate device, like the intermediate device 3 which has been described here above.

What is claimed is:

1. A walkway assembly for a transport vehicle, the assembly comprising:
    a framework with fastening means on a body of the transport vehicle, the framework delimiting a lateral opening;
    a swiveling floor located during operation in a proximity of a door of the transport vehicle for forward motion of travelers, the swiveling floor comprising a surface for forward motion and being mounted in a swiveling manner in relation to the framework about a first swivel axis provided opposite to the lateral opening;
    an intermediate device located below the surface for forward motion, the intermediate device mounted in a swiveling manner in relation to the framework about a second swivel axis that is substantially coincident with the first swivel axis, the intermediate device and the swiveling floor able to swivel relative to the framework in a mutually independent manner;
    a sliding system that is movable in translation in relation to the intermediate device between a stowed position and a deployed position, the sliding system and the surface for forward motion forming a ramp that extends through the lateral opening.

2. The assembly according to claim 1, further comprising:
    first propulsion means; and first transmission means configured to swivel the intermediate device;
    second propulsion means and second transmission means configured to swivel the swiveling floor.

3. The assembly according to claim 2, wherein the first propulsion means and the second propulsion means are formed by a single propulsion assembly configured to respectively cooperate with the first transmission means and the second transmission means.

4. The assembly according to claim 3, further comprising:
    selection means configured to present a first operational configuration in which the selection means ensures swiveling of the intermediate device, the selection means configured to present a second operational configuration in the selection means configured to ensure swiveling of the swiveling floor.

5. The assembly according to claim 4, wherein the selection means comprises a lever ending in a roller, the lever configured to be driven by a transmission shaft, the roller configured to selectively cooperate with either a first transmission body or a second transmission body.

6. The assembly according to claim 5, wherein the first transmission body comprises an accommodation consolidated with the framework, the roller configured to roll along walls of the accommodation to ensure swiveling of the intermediate device through an intermediary of an effect brought about by the lever, wherein the second transmission body comprises a support element consolidated with the swiveling floor, the support element configured to cooperate with the roller.

7. The assembly according to claim 2, further comprising:
    driving means for driving the sliding system in relation to the intermediate device, the driving means configured to cooperate with the first propulsion means or the second propulsion means, the driving means of the sliding system comprising at least one chain or a belt configured to be driven by the first propulsion means or the second propulsion means, the driving means including at least one respective mechanical connecter configured to consolidate the chain with the sliding system.

8. The assembly according to claim 2, further comprising:
    locking means for locking the swiveling floor in relation to the framework, the locking means movable between an active position in which the locking means locks the swiveling floor in relation to the framework and an inactive position in which the locking means frees the swiveling floor in relation to the framework to allow swiveling of the swiveling floor under effect of the second propulsion means.

9. The assembly according to claim 1, further comprising:
    consolidation means for consolidation of the swiveling floor in relation to the intermediate device, the consolidation means configured to mutually consolidate the swiveling floor and the intermediate device during upward motion of the swiveling floor and the intermediate device.

10. The assembly according to claim 1, wherein the sliding system comprises a succession of blades movable perpendicular to a main dimension of the succession of blades, the blades being mutually parallel and parallel to an axis of travel of the vehicle during operation.

11. The assembly according to claim 10, wherein the intermediate device comprises a first track for movement of the blades perpendicular to the main dimension, wherein the sliding system comprises a second track for movement of the blades, the assembly further comprising:

shifting means for shifting the blades between the first and second tracks, the shifting means comprising carriages linking adjacent blades of the blades, each of the carriages configured to bear against a side wall of the sliding system, at least two of the carriages associated with each pair of the adjacent blades at a respective end of the adjacent blades, the carriages configured to move away from each other under effect of an elastic means.

12. A transport vehicle comprising walkway assembly according to claim 1.

13. The transport vehicle according to claim 12, further comprising:

a vehicle body that includes a fixed floor in a same plane as the surface for forward motion of the swiveling floor in a so-called rest position of the swiveling floor, wherein the fixed floor and the surface for forward motion define a continuity of surfaces in an inclined position of the swiveling floor in relation to the fixed floor.

14. The transport vehicle according to claim 13, wherein the transport vehicle includes at least two of the walkway assemblies extending over only a portion of a width of the vehicle body, the at least two walkway assemblies laid out on sides of a transverse direction of the vehicle body, wherein the swiveling axes of the at least two walkway assemblies extending in proximity of each other.

15. A method for implementation of the transport vehicle according to claim 13, wherein the fixed floor of the vehicle body is located above a traveler disembarkation platform, the method comprising:

downwardly swiveling of the intermediate device in relation to the framework;
translationally displacing the sliding system in an opposite direction of the intermediate device;
downwardly swiveling the swiveling floor; and
opening the door.

16. The method according to claim 15, further comprising:

unlocking a locking element between translational displacement of the sliding system and downward swiveling of the swiveling floor.

17. The method according to claim 16 further comprising:
upwardly swiveling the swiveling floor;
closing the door; and
retracting the swiveling floor in relation to the intermediate device.

18. The method according to claim 17, further comprising locking the locking element between swiveling of the swiveling floor and closing of the door.

19. The method of claim 15, further comprising:
translationally displacing the sliding system in an opposite direction of the intermediate device;
opening the door; and
simultaneously upwardly swiveling the intermediate device and the swiveling floor.

20. The method according to claim 19, further comprising:
simultaneously downwardly swiveling the intermediate device and the swiveling floor;
closing the door; and
translationally displacing the sliding system towards the intermediate device.

* * * * *